United States Patent
Moran, III et al.

(10) Patent No.: US 10,367,580 B2
(45) Date of Patent: Jul. 30, 2019

(54) REVERSE-DIRECTION TAP (RDT), REMOTE DIAGNOSTIC MANAGEMENT TOOL (RDMT), AND ANALYSES USING THE RDT AND THE RDMT

(71) Applicant: Futurewei Technologies, Inc., Plano, TX (US)

(72) Inventors: John L. Moran, III, Millville, MA (US); Liming Fang, Shenzhen (CN); Jim Chen, Corona, CA (US); Li Zhang, Wuhan (CN); Xiaolong Zhang, Wuhan (CN); Karl E. Moerder, Poway, CA (US); Marc L. Morrissette, Plainville, MA (US)

(73) Assignee: Futurewei Technologies, Inc., Plano, TX (US)

( * ) Notice: Subject to any disclaimer, the term of this patent is extended or adjusted under 35 U.S.C. 154(b) by 203 days.

(21) Appl. No.: 15/042,322

(22) Filed: Feb. 12, 2016

(65) Prior Publication Data
US 2016/0241334 A1    Aug. 18, 2016

Related U.S. Application Data

(60) Provisional application No. 62/147,119, filed on Apr. 14, 2015, provisional application No. 62/132,807, filed on Mar. 13, 2015, provisional application No. 62/116,840, filed on Feb. 16, 2015.

(51) Int. Cl.
*H04N 21/24* (2011.01)
*H04B 10/077* (2013.01)
*H04L 12/26* (2006.01)

(52) U.S. Cl.
CPC ..... *H04B 10/0775* (2013.01); *H04B 10/0773* (2013.01); *H04L 43/12* (2013.01); *H04L 43/50* (2013.01); *H04N 21/24* (2013.01)

(58) Field of Classification Search
CPC .................................................. H04N 21/24
See application file for complete search history.

(56) References Cited

U.S. PATENT DOCUMENTS

| | | | |
|---|---|---|---|
| 6,906,526 | B2 | 6/2005 | Hart, Jr. et al. |
| 7,086,078 | B1 | 8/2006 | Gresko et al. |

(Continued)

FOREIGN PATENT DOCUMENTS

| | | |
|---|---|---|
| CN | 1296350 A | 5/2001 |
| CN | 200941630 Y | 8/2007 |
| CN | 101335904 A | 12/2008 |

OTHER PUBLICATIONS

Foreign Communication From a Counterpart Application, PCT Application No. PCT/CN2016/073869, English Translation of International Search Report dated May 18, 2016, 7 pages.

(Continued)

*Primary Examiner* — Michael H Hong
(74) *Attorney, Agent, or Firm* — Conley Rose, P.C.

(57) ABSTRACT

A coaxial cable tap comprises a housing, and a faceplate coupled to the housing. The faceplate comprises a first directional tap port, and a diagnostic reverse (DR) port configured to receive a first upstream signal originating downstream from the coaxial cable tap, and inject a downstream test signal in a downstream direction. A hybrid fiber-coaxial (HFC) network comprises a headend, a first amplifier coupled to the headend, and a tap coupled to the first amplifier, configured to couple to a plurality of cable modems (CMs), and comprising a diagnostic forward (DF) port configured to receive a downstream signal originating from the first amplifier, and inject an upstream test signal in an upstream direction for reception at the headend.

14 Claims, 19 Drawing Sheets

(56) References Cited

U.S. PATENT DOCUMENTS

| | | | |
|---|---|---|---|
| 2003/0145075 A1* | 7/2003 | Weaver | H04B 3/46 |
| | | | 709/223 |
| 2003/0149991 A1* | 8/2003 | Reidhead | H04L 1/24 |
| | | | 725/119 |
| 2004/0178801 A1 | 9/2004 | Hart et al. | |
| 2004/0245995 A1* | 12/2004 | Williams | H04N 17/00 |
| | | | 324/512 |
| 2005/0251841 A1* | 11/2005 | Boyce | H04L 12/2801 |
| | | | 725/111 |
| 2009/0007210 A1 | 1/2009 | Nishide et al. | |
| 2012/0213083 A1 | 8/2012 | Shafer et al. | |
| 2013/0301632 A1 | 11/2013 | Aizawa | |
| 2014/0123203 A1 | 5/2014 | Oliver et al. | |
| 2014/0282783 A1* | 9/2014 | Totten | H04L 12/2885 |
| | | | 725/111 |

OTHER PUBLICATIONS

Foreign Communication From a Counterpart Application, PCT Application No. PCT/CN2016/073869, English Translation of Written Opinion dated May 18, 2016, 4 pages.
Foreign Communication From a Counterpart Application, European Application No. 16751942.0, Extended European Search Report dated Dec. 13, 2017, 8 pages.
Foreign Communication From A Counterpart Application, Chinese Application No. 201680008174.X, Chinese Office Action dated Apr. 25, 2019, 5 pages.

\* cited by examiner

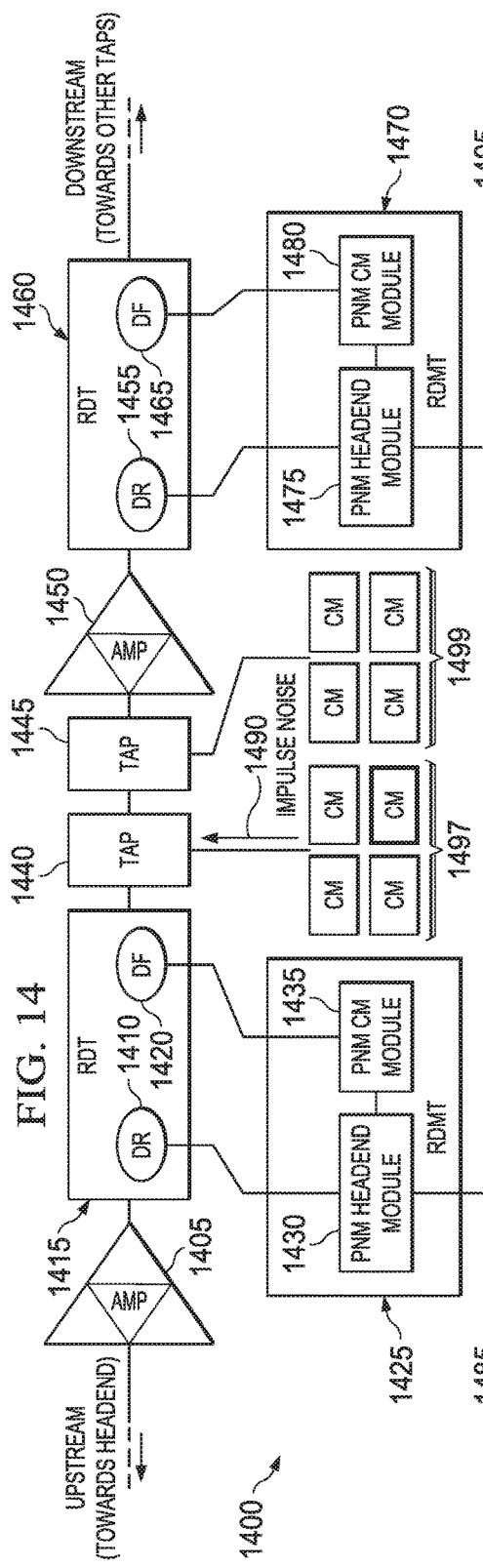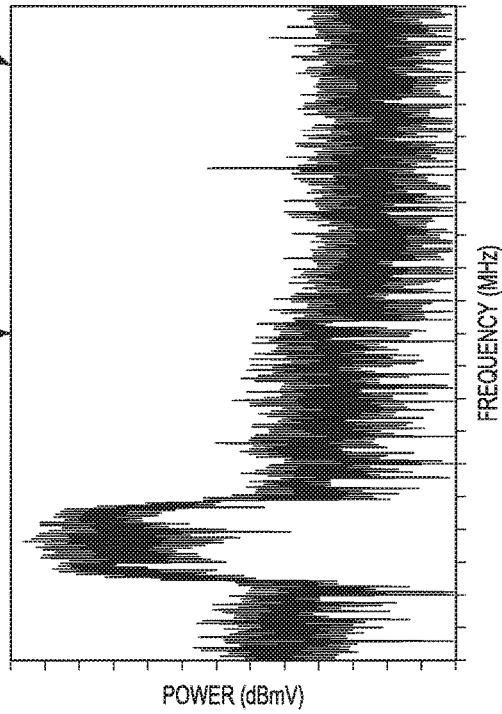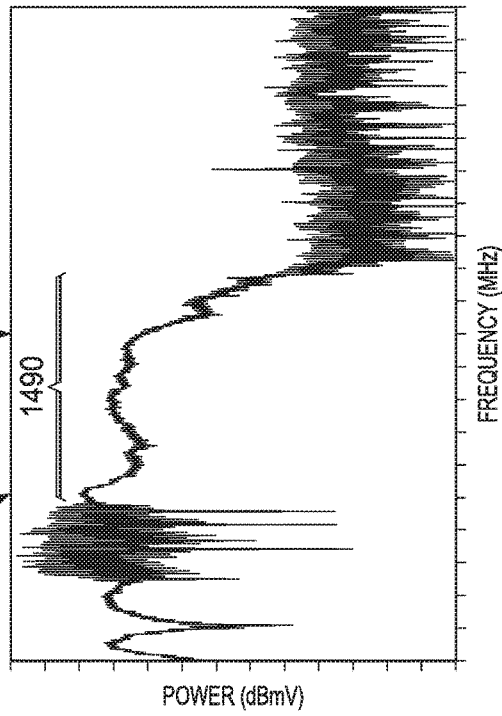
FIG. 14

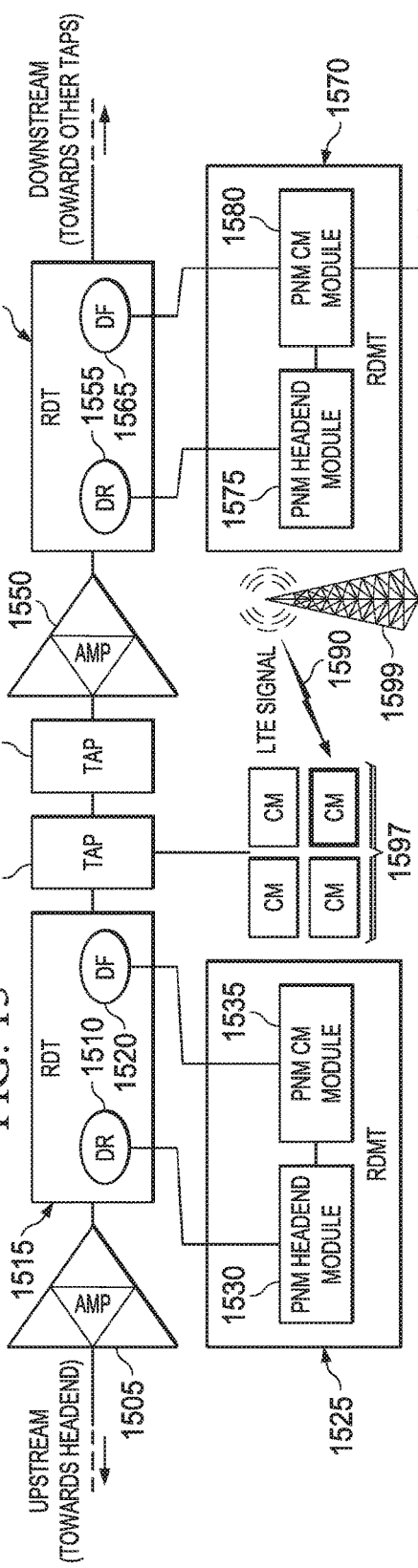
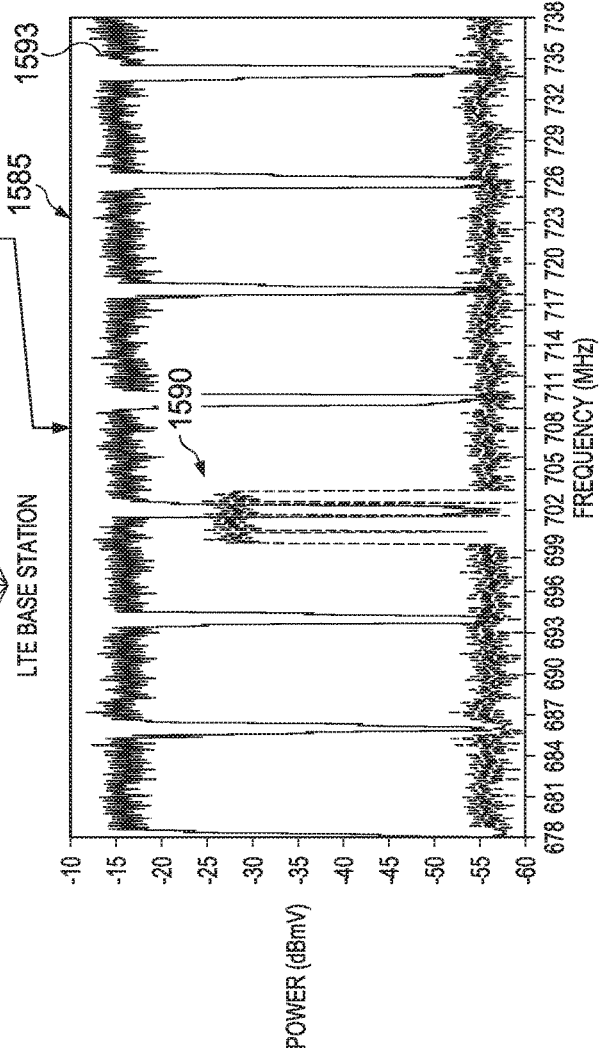
FIG. 15

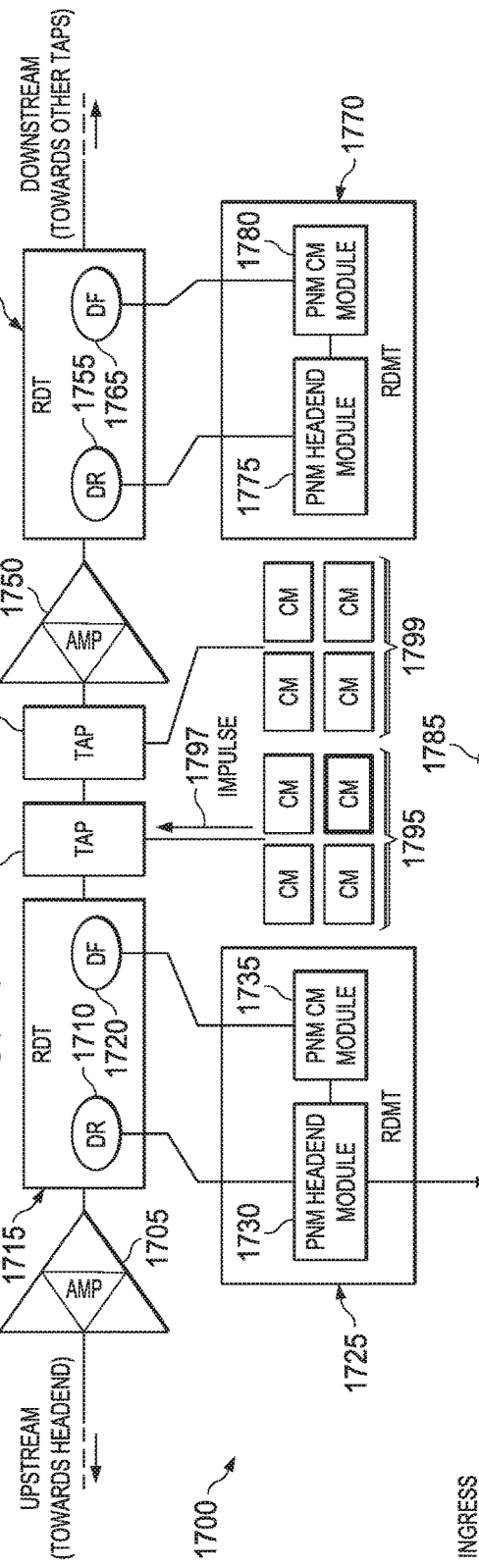
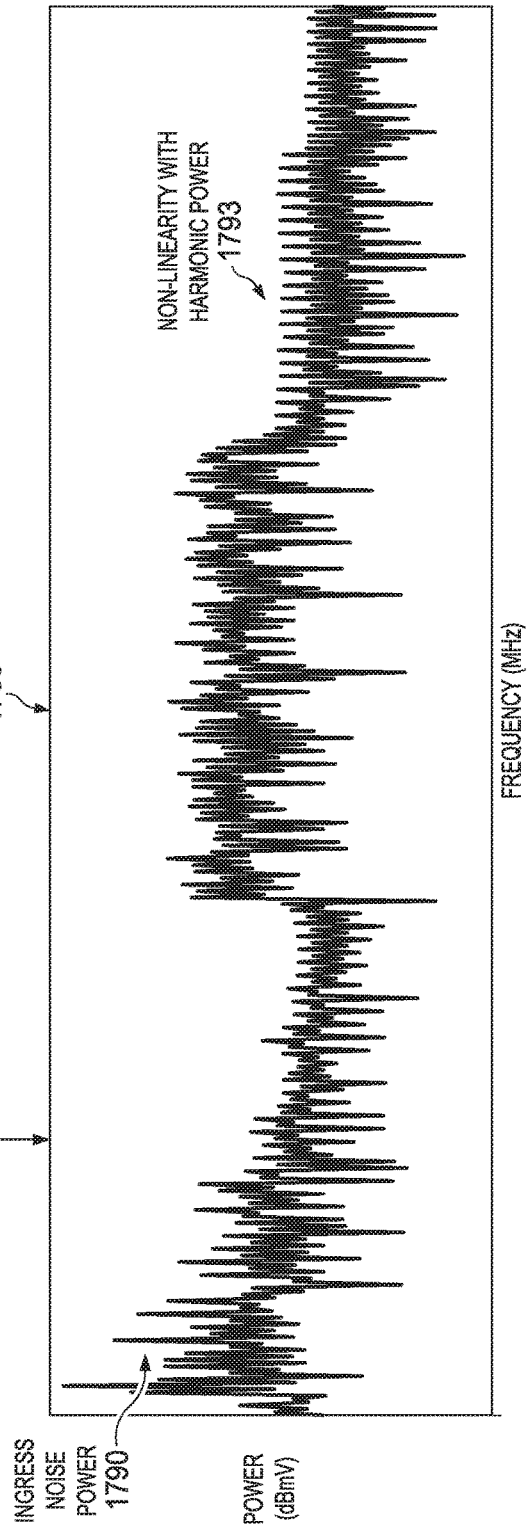
FIG. 17

REVERSE-DIRECTION TAP (RDT), REMOTE DIAGNOSTIC MANAGEMENT TOOL (RDMT), AND ANALYSES USING THE RDT AND THE RDMT

CROSS-REFERENCE TO RELATED APPLICATIONS

This application claims priority to U.S. provisional application No. 62/116,840 filed Feb. 16, 2015 by John Moran, et al., and titled "Combination of Forward-Direction Tap (FDT) and Reverse-Direction Tap (RDT) for Measuring Cable Plant Forward Path and Reverse Path"; U.S. provisional application No. 62/132,807 filed Mar. 13, 2015 by John Moran, et al., and titled "Remote Proactive Network Management (PNM) Diagnostics in a Cable Plant"; and U.S. provisional application No. 62/147,119 filed Apr. 14, 2015 by John L. Moran III, et al., and titled "Fast Fourier Transform (FFT) Measurements Using Remote Proactive Network Management (PNM) Diagnostic Tools," which are incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Hybrid fiber-coaxial (HFC) networks are broadband networks that combine optical fibers and coaxial cables. Cable television (CATV) operators have deployed HFC networks since the early 1990s. When CATV operators operate multiple HFC networks, they are referred to as multi-system operators (MSOs). HFC networks typically employ frequency-division multiplexing (FDM), quadrature amplitude modulation (QAM), and other networking and modulation techniques to provide a variety of services, including television (TV), telephony, and Internet services. CableLabs Data Over Cable Service Interface Specification (DOCSIS) 3.1, which is a standard for MSOs, provides for Internet service at data rates between 1 gigabit per second (Gb/s) and 10 Gb/s.

SUMMARY

In one embodiment, the disclosure includes a coaxial cable tap comprising a housing and a faceplate coupled to the housing. The faceplate comprises a first directional tap port, and a diagnostic reverse (DR) port configured to receive a first upstream signal originating downstream from the coaxial cable tap, and inject a downstream test signal in a downstream direction. In some embodiments, the faceplate is configured to replace a pre-existing faceplate without disrupting service to a network associated with the coaxial cable tap and/or the faceplate further comprises a diagnostic forward (DF) port configured to: receive a first downstream signal originating upstream from the coaxial cable tap; and inject an upstream test signal in an upstream direction and/or the DF port is further configured to pass network power and/or the coaxial cable tap further comprises: a second directional tap port; a third directional tap port; and a fourth directional tap port and/or the first directional tap port, the second directional tap port, the third directional tap port, and the fourth directional tap port are each configured to: pass received downstream signals only further downstream; and pass received upstream signals only further upstream and/or the faceplate further comprises: an output port configured to couple to an output line; a first directional coupler coupled to the output port and the DF port; and a second directional coupler coupled to the first directional coupler and the DR port and/or the faceplate further comprises: a third directional coupler coupled to the second directional coupler; a first splitter coupled to the third directional coupler; a second splitter coupled to the first splitter, the first directional tap port, and the third directional tap port; and a third splitter coupled to the first splitter, the second directional tap port, and the fourth directional tap port and/or the first directional coupler is configured to: couple an input line to an output line in a bidirectional manner; and couple the DF port to the input line, but not the output line, in a bidirectional manner and/or wherein the second directional coupler is configured to: couple the input line to the output line in a bidirectional manner; and couple the DR port to the output line, but not the input line, in a bidirectional manner.

In another embodiment, the disclosure includes a hybrid fiber-coaxial (HFC) network comprising: a headend; a first amplifier coupled to the headend; and a tap coupled to the first amplifier, configured to couple to a plurality of cable modems (CMs), and comprising a diagnostic forward (DF) port configured to: receive a downstream signal originating from the first amplifier; and inject an upstream test signal in an upstream direction for reception at the headend. In some embodiments, the network further comprises a second amplifier coupled to the tap, wherein the tap further comprises a diagnostic reverse (DR) port configured to: receive an upstream signal originating from the second amplifier; and inject a downstream test signal in a downstream direction for reception at one of the CMs.

In yet another embodiment, the disclosure includes a remote diagnostic management tool (RDMT) comprising: a Proactive Network Management (PNM) headend module configured to couple to a diagnostic reverse (DR) port of a reverse-direction tap (RDT); and a PNM cable modem (CM) module coupled to the PNM headend module and configured to couple to a diagnostic forward (DF) port of the RDT. In some embodiments, the PNM headend module is further configured to: monitor, capture, and analyze upstream signals originating downstream from the RDT and via the DR port; inject downstream test signals into the DR port; and measure local noise at the RDT and/or the PNM CM module is further configured to: receive analysis commands from a headend; forward the analysis commands to the PNM headend module; receive analyses from the PNM headend module; and forward the analyses to the headend and/or the PNM CM module is further configured to: monitor, capture, and analyze downstream signals originating upstream from the RDT and via the DF port; perform timing and mapping for a headend; and inject upstream test signals into the DF port.

In yet another embodiment, the disclosure includes a method implemented in a hybrid fiber-coaxial (HFC) network, the method comprising: receiving a first signal from a first reverse-direction tap (RDT); analyzing the first signal with a first remote diagnostic management tool (RDMT); receiving a second signal from a second RDT located downstream from the first RDT; analyzing the second signal with a second RDMT; comparing the first signal to the second signal; and determining, based on the comparing, a location of a faulty component in the network. In some embodiments, the first signal is a first upstream signal received via a first diagnostic reverse (DR) tap of the first RDT and a first Proactive Network Management (PNM) headend module of the first RDMT, and wherein the second signal is a second upstream signal received via a second DR tap of the second RDT and a second PNM headend module of the second RDMT and/or the first signal comprises a non-linearity, wherein the second signal does not comprise a non-linearity, and wherein the determining comprises ascertaining that the location is between the first RDT and the second RDT and/or the first signal is a first downstream signal received via a first diagnostic forward (DF) tap of the first RDT and a first Proactive Network Management (PNM) cable modem (CM) module of the first RDMT, wherein the second signal is a second downstream signal received via a second DF tap of the second RDT and a second PNM CM module of the second RDMT, wherein the first signal does not comprise a non-linearity, wherein the second signal comprises a non-linearity, and wherein the determining comprises ascertaining that the location is between the first RDT and the second RDT.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 14 is a schematic diagram of an upstream HFC network analyzing system analyzing an impulse noise according to an embodiment of the disclosure.

FIG. 15 is a schematic diagram of a downstream HFC network analyzing system analyzing a Long-Term Evolution (LTE) signal according to an embodiment of the disclosure.

FIG. 17 is a schematic diagram of an upstream HFC network analyzing system analyzing impulse noise power and a non-linearity according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
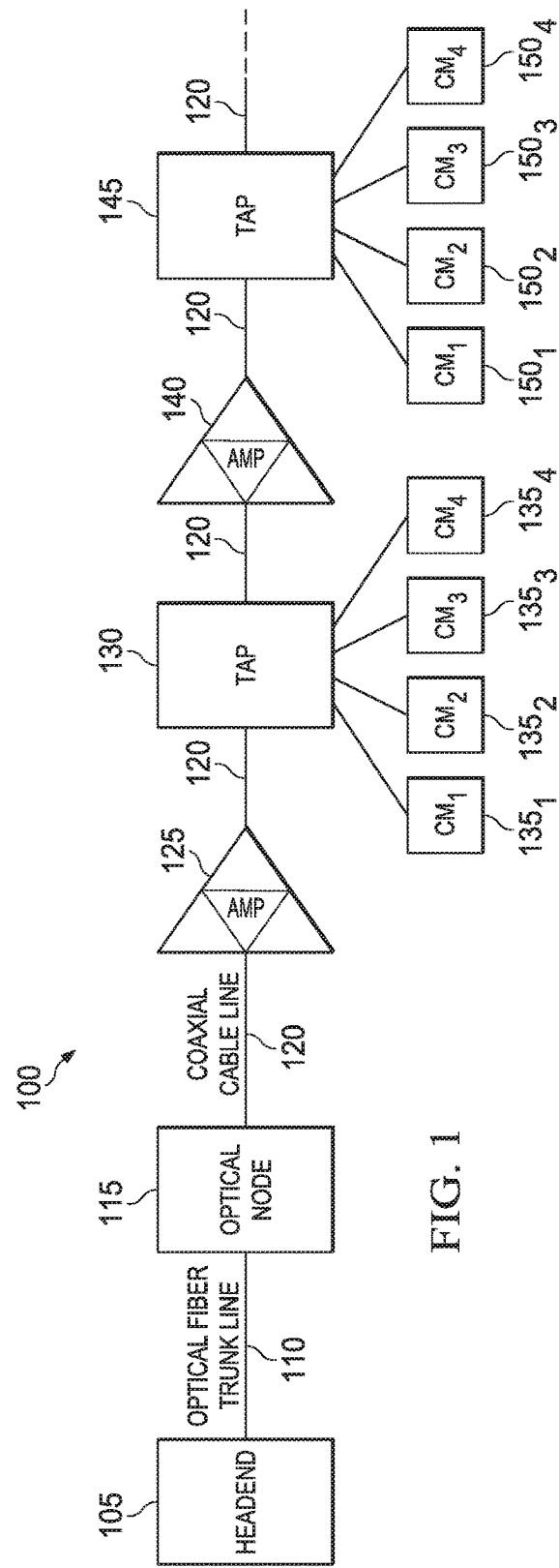
FIG. 1 is a schematic diagram of an HFC network.

FIG. 1 is a schematic diagram of an HFC network 100. The network 100 generally comprises a headend 105; optical fiber trunk line 110; an optical node 115; a coaxial cable line 120; amplifiers (amps) 125, 140; taps 130, 145; and cable modems (CMs) 135, 150. The network 100 may employ DOCSIS 3.0 or DOCSIS 3.1, which are incorporated by reference, or another standard.

The headend 105 may be, for instance, a Converged Cable Access Platform (CCAP), an integrated CCAP (ICCAP), or a DOCSIS cable modem termination system (CMTS). The headend 105 provides multiple functions. First, the headend 105 communicates with the CMs 135, 150 via the optical node 115 using optical transmitters and receivers. Second, the headend 105 communicates with a backbone network such as the Internet using other optical transmitters and receivers. Third, the headend 105 therefore serves as an intermediary between the CMs 135, 150 on the one hand and the backbone network on the other hand. Fourth, the headend 105 schedules both downstream (DS) and upstream (US) communications. Downstream communications, or forward-path communications, refer to communications from the headend 105 to the CMs 135, 150. Upstream communications, which may also be referred to as return-path communications or reverse-path communications, refer to communications from the CMs 135, 150 to the headend 105.

The optical fiber trunk line 110 couples the headend 105 to the optical node 115. The optical fiber trunk line 110 may comprise an inner optical fiber that communicates optical signals and an outer insulating layer that protects the fiber from environmental and other conditions. The optical fiber trunk line 110 is typically many kilometers (km) long.

The optical node 115 converts optical signals from the headend 105 into electrical signals and forwards those electrical signals to the CMs 135, 150. Similarly, the optical node 115 converts electrical signals from the CMs 135, 150 to optical signals and forwards those optical signals to the headend 105. The optical node 115 is located at the entrance of a subdivision or another location.

The coaxial cable line 120 couples the optical node 115 to the amp 125, the amp 125 to a tap 130, the tap 130 to the CMs 135, the tap 130 to the amp 140, the amp 140 to the tap 145, and the tap 145 to the CMs 150. Alternatively, each described portion of the coaxial cable line 120 is a separate line. The coaxial cable line 120 may comprise four layers. The first, innermost layer is a copper core that communicates electrical signals. The second layer is a dielectric insulator; the third layer is a metallic shield; and the fourth, outermost layer is a plastic jacket. The coaxial cable line 120 is typically less than 1 km long. The coaxial cable line 120 may be semi-rigid and may be referred to as hardline.

The amps 125, 140 amplify electrical signals in both the forward path and return path directions of the network 100, and the amps 125, 140 equalize electrical signals in the forward path direction of the network 100 to compensate for frequency roll-off, or slope, which occurs as a result of the electrical signals traversing both the coaxial cable line 120 and the taps 130, 145. Equalization may also be referred to as positive tilt compensation, which comprises adding a sufficient amount of pre-emphasis to electrical signals in order to flatten a frequency response at the input of a subsequent component. The amps 125, 140 may receive alternating current (AC) power from the coaxial cable line 120 and therefore do not require their own power sources. The amps 125, 140 are located at any suitable locations. As shown by the ellipsis, there may be additional amps similar to the amps 125, 140. Furthermore, additional amps may be present at the customer premises.

The taps 130, 145 are coaxial cable taps and pass the coaxial cable line 120 from an input port to an output port and provide tap outputs for the CMs 135, 150 as described below. The taps 130, 145 are passive devices, meaning that they do not supply their own power. While the tap 130 shows connections to the four CMs 135 and the tap 145 shows connections to the four CMs 150, the taps 130, 145 may connect to any number of CMs. The taps 130, 145 typically block the AC power from the coaxial cable line 120. The taps 130, 145 are located at the end of streets or other locations. As shown by the ellipsis, there may be additional taps similar to the taps 130, 145.

The CMs 135, 150 provide multiple functions. First, the CMs 135, 150 communicate with the headend 105 via the optical node 115 using electrical transmitters and receivers. Second, the CMs 135, 150 communicate with subscriber devices using other electrical transmitters and receivers. Third, the CMs 135, 150 therefore serve as intermediaries between the headend 105 on the one hand and the subscriber devices on the other hand. The subscriber devices include computers, TVs, or other Internet-enabled devices. When the CMs 135, 150 communicate with TVs, the CMs 135, 150 may be referred to as set-top boxes (STBs). The CMs 135, 150 are located at customer premises, for instance, at or in houses. Though four CMs 135 and four CMs 150 are shown, there may be fewer or more CMs 135, 150.

Figure 2:
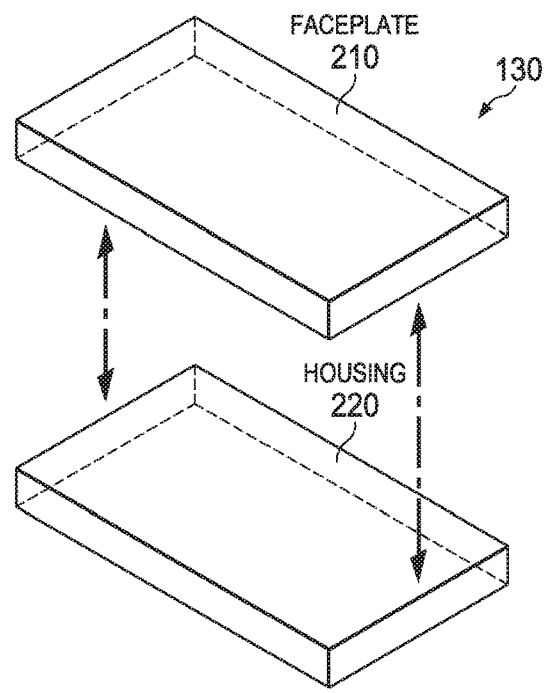
FIG. 2 is a perspective view of the tap in FIG. 1.

FIG. 2 is a perspective view of the tap 130 in FIG. 1. The tap 130 comprises a faceplate 210 and a housing 220. The faceplate 210 and the housing 220 are fastened together using screws or other suitable means. The faceplate 210 is described further below. The housing 220 comprises circuitry that implements the design of the faceplate 210, provides a connection to the coaxial cable line 120, and provides bypass capability when the faceplate 210 is not installed. The tap 145 in FIG. 1 is similar to the tap 130.

Figure 3:
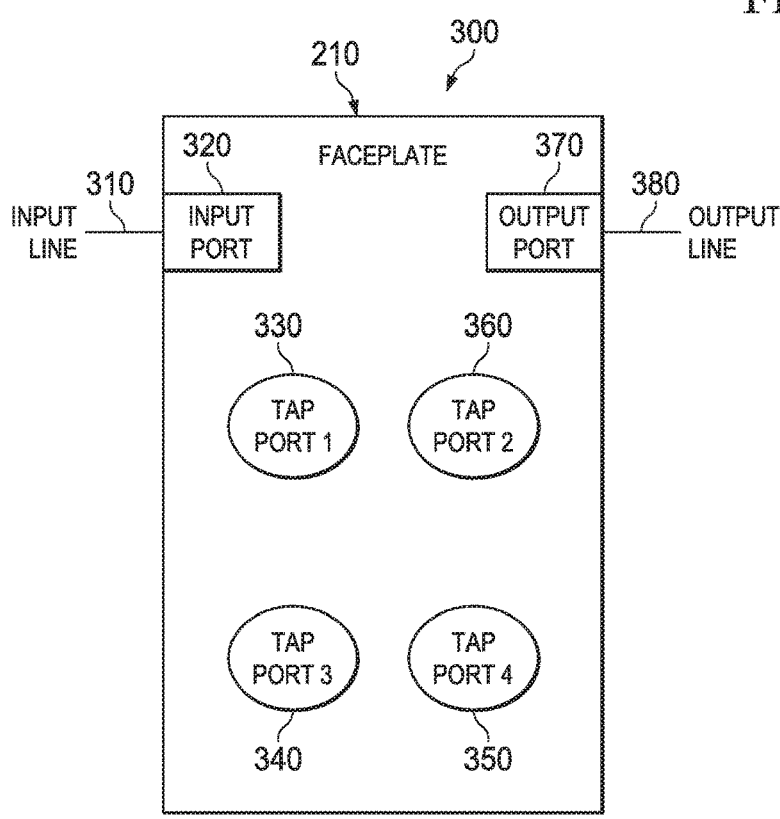
FIG. 3 is a top view of a faceplate system.

FIG. 3 is a top view of a faceplate system 300. The system 300 comprises an input line 310, the faceplate 210, and the output line 380. The input line 310 and the output line 380 correspond to the coaxial cable line 120 in FIG. 1.

The faceplate 210 comprises an input port 320, a tap port 1 330, a tap port 3 340, a tap port 4 350, a tap port 2 360, and an output port 370. The input port 320 provides an input for the input line 310, and the output port 370 provides an output for the output line 380. The input port 320 and the output port 370 are bidirectional, meaning that they may pass signals both upstream and downstream from the tap 130.

The tap port 1 330 is dedicated to the $CM_1$ $135_1$, the tap port 2 360 is dedicated to the $CM_2$ $135_2$, the tap port 3 340 is dedicated to the $CM_3$ $135_3$, and the tap port 4 350 is dedicated to the $CM_4$ $135_4$. As an example, the tap 130 has a 23 decibel (dB) tap loss, which means that the level of a downstream signal measured at the tap ports 330, 340, 350, 360 is 23 dB less than the level of the same signal measured at the input port 320. The tap 130 has a 35 dB isolation loss, which means that the level of an upstream signal measured at the tap ports 330, 340, 350, 360 is 35 dB less than the level of the same signal measured at the output port 370. Though four tap ports are shown, the faceplate 210 may have any number of tap ports. A typical faceplate may have between two and eight tap ports.

First, the tap ports 330-360 are directional tap ports, meaning that they may only pass downstream signals from the headend 105 to the CMs 135 and pass upstream signals from the CMs 135 to the headend 105. Thus, upstream signals originating downstream from the tap 130, for instance upstream signals from the CMs 150, cannot pass through the tap ports 330-360. For that reason, a technician cannot analyze those upstream signals or their associated noise at the tap ports 330-360 without disconnecting the tap 130, connecting an analyzer, and therefore disrupting service to the CMs 135. Similarly, a technician cannot inject a downstream test signal at the tap ports 330-360 without disconnecting the tap 130, connecting an analyzer, and therefore disrupting service to the CMs 135. Only at the headend 105 can a technician analyze upstream signals and inject downstream test signals without disrupting service to the CMs 135, 150. That analysis allows the technician to identify the existence of impairments in the network 100. However, the headend 105 is an endpoint of the network 100, so that analysis does not allow the technician to locate the impairments. In other words, the technician cannot identify which specific middlepoint components or segments of the network 100 are responsible for the impairments.

Second, the CMs 135, 150 may monitor downstream signals; provide metrics such as signal levels, modulation error ratios (MERs), and forward error correction (FEC) statistics; provide services such as full-band capture (FBC) and downstream network troubleshooting; and transmit associated data to the headend 105. The headend 105, but not the CMs 135, 150 or other middlepoint components, may monitor upstream signals and provide those metrics. However, to locate upstream impairments, including impulse noise, it may be necessary to analyze those upstream signals as multiple locations in the network 100. This is because the headend 105 suffers from noise funneling, which refers to the headend 105 receiving a sum of all impairments from every component in the network 100.

Third, an MSO may spend considerable time locating and fixing impairments in the network 100. This causes customer dissatisfaction. PNM techniques such as spectrum analyses are used for analyzing the network. However, existing PNM techniques are limited because they are based on analyses of signals either at the headend 105 or the CMs 135, 150, but not at middlepoints in the network 100. Once again, the technician cannot identify which specific middlepoint components or segments of the network 100 are responsible for the impairments.

Disclosed herein are embodiments for analyzing both downstream and upstream signals in a cable network such as an HFC network or another suitable network. In a first embodiment, an RDT comprises a faceplate with both a diagnostic forward (DF) port and a diagnostic reverse (DR) port. The DF port provides a connection to downstream signals originating upstream from the RDT, and the DR port provides a connection to upstream signals originating downstream from the RDT. The faceplate of the RDT may replace a pre-existing faceplate of a pre-existing tap without disrupting service to CMs. In a second embodiment, an RDMT is coupled to the RDT. The RDMT may be embedded in the network. The RDMT comprises a PNM headend module coupled to the DR port of the RDT and a PNM CM module coupled to the DF port of the RDT. The PNM headend module analyzes upstream signals and injects downstream test signals anywhere in the network, including at middlepoints in the network. The PNM CM module analyzes downstream signals and injects upstream test signals anywhere in the network, including at middlepoints in the network. Thus, a technician may identify both the existence and the location of network impairments with a detailed and localized view of the network. In a third embodiment, embedded network maintenance (ENM) techniques provide for various analyses both downstream and upstream signals at any point in the network.

Figure 4:
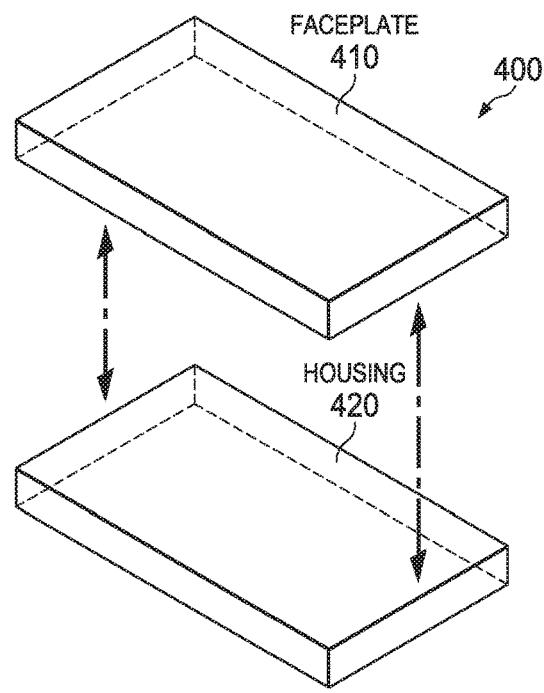
FIG. 4 is a perspective view of a reverse-direction tap (RDT) according to an embodiment of the disclosure.

FIG. 4 is a perspective view of an RDT 400 according to an embodiment of the disclosure. The RDT 400 comprises a faceplate 410 and a housing 420. The faceplate 410 and the housing 420 are fastened together using screws or other suitable means. The RDT 400 in FIG. 4 appears similar to the tap 130 in FIG. 2. For instance, the housing 420 is similar to the housing 220. However, the faceplate 410 is different from the faceplate 210 as described further below.

Figure 5:
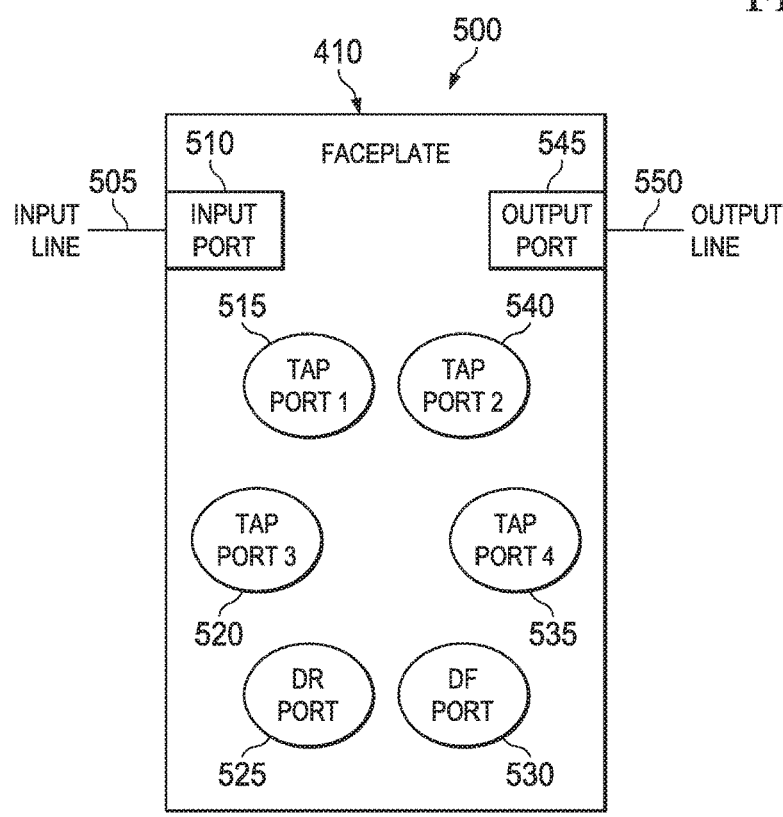
FIG. 5 is a top view of a faceplate system according to an embodiment of the disclosure.

FIG. 5 is a top view of a faceplate system 500 according to an embodiment of the disclosure. The system 500 comprises an input line 505 similar to the input line 310, the faceplate 410, and an output line 550 similar to the output line 380. The faceplate 410 comprises an input port 510 similar to the input port 320, a tap port 1 515 similar to the tap port 1 330, a tap port 3 520 similar to the tap port 3 340, a tap port 4 535 similar to the tap port 4 350, a tap port 2 540 similar to the tap port 2 360, and an output port 545 similar to the output port 370. However, unlike the faceplate 210, the faceplate 410 also comprises a DR port 525 and a DF port 530. Though six tap ports are shown, the faceplate 210 may have any number of tap ports.

The RDT 400 may replace the taps 130, 145 in the network 100. However, the housing 220 may already support the faceplate 410, including the DR port 525 and the DF port 530. Thus, alternatively, just the faceplate 410 may replace the pre-existing faceplate 210 of the pre-existing tap 130 or the pre-existing faceplate of the pre-existing tap 145 in the network 100. In that case, the housing 420 need not also replace the housing 220, which would disrupt service to the CMs 135, 150. Rather, upon replacing the faceplate 210 with the faceplate 410, a shorting bar, or mechanical bypass, in the housing 220 connects the input port 510 to the output port 545 without arcing and without disrupting service to the CMs 135, 150. Replacing the faceplate 210 with the faceplate 410 may add about 1.5 dB of insertion loss.

The DR port 525 and the DF port 530 provide for analyzing upstream signals and injecting downstream test signals. The DR port 525 and the DF port 530 may exclusively provide for such analyzing, but may not provide regular signal paths to the CMs 135, 150. As an example, the RDT 400 replaces the tap 130. In that case, the DR port 525 receives upstream signals originating downstream from the RDT 400 at, for instance, the tap 145. The DR port 525 also injects downstream signals towards, for instance, the tap 145. The DF port 530 receives downstream signals originating upstream from the RDT 400 at, for instance, the headend 105. The DF port 530 also injects upstream signals towards, for instance, the headend 105. The DR port 525 and the DF port 530 are single ports in order to minimize through loss.

As an example, the tap ports 515, 520, 535, 540 have a 23 dB tap loss, which means that the level of a downstream signal measured at the tap ports 515, 520, 535, 540 is 23 dB less than the level of the same signal measured at the input port 510. The tap ports 515, 520, 535, 540 have a 35 dB isolation loss, which means that the level of an upstream signal measured at the tap ports 515, 520, 535, 540 is 35 dB less than the level of the same signal measured at the output port 545. The DR port 525 has a 20 dB tap loss for upstream received signals and downstream test signals. In addition, the DR port 525 has an isolation of 35 dB for downstream received signals. The DF port 530 has a 23 dB tap loss like the tap ports 515, 520, 535, 540.

Figure 6:
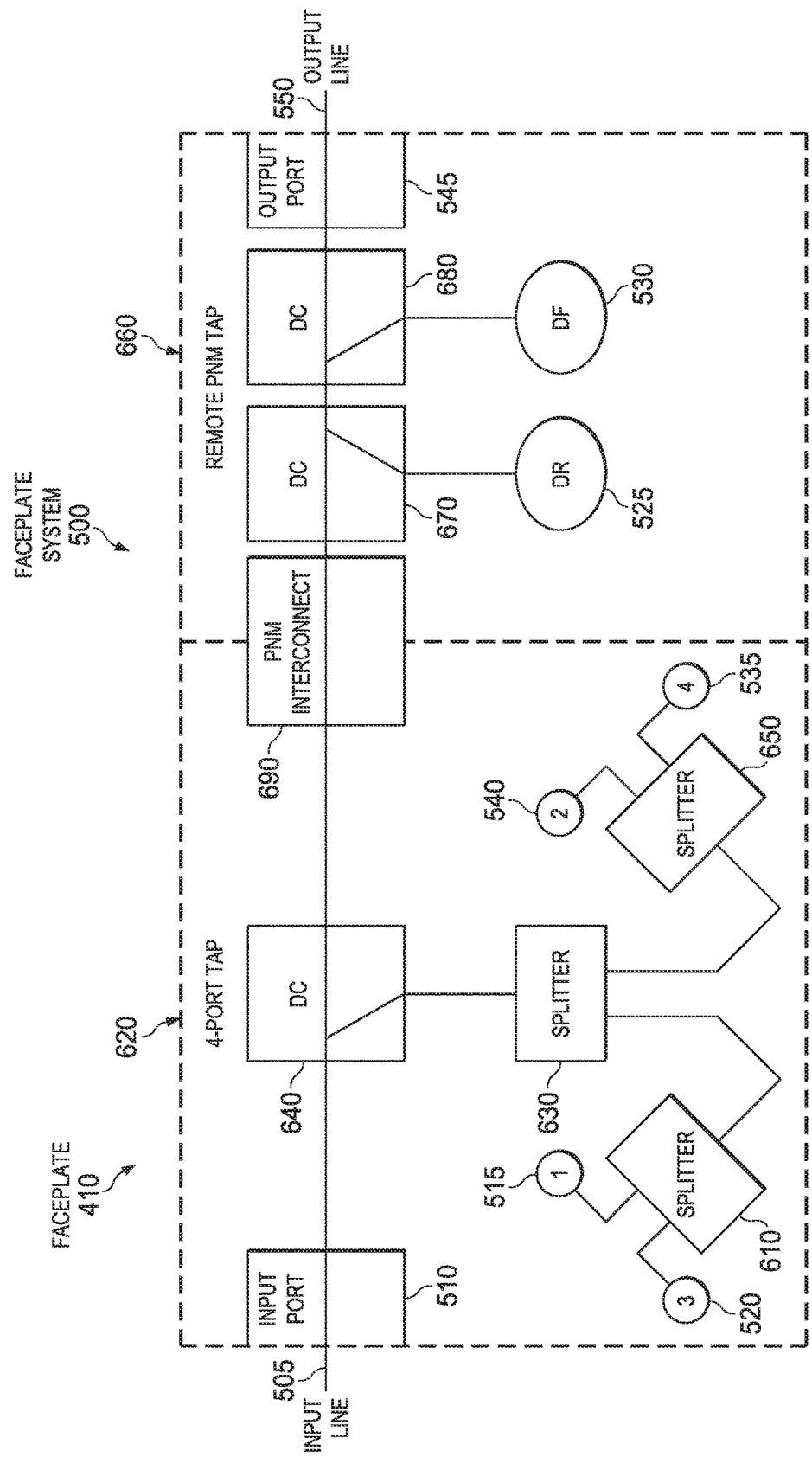
FIG. 6 is a transparent view of the faceplate system in FIG. 5 according to an embodiment of the disclosure.

FIG. 6 is a transparent view of the faceplate system 500 in FIG. 5 according to an embodiment of the disclosure. Like FIG. 5, FIG. 6 shows the input line 505, the faceplate 410, and the output line 550. In addition, FIG. 6 shows that the faceplate 410 comprises a 4-port tap 620, a remote proactive network management (PNM) tap 660, and a PNM interconnect 690.

The 4-port tap 620 comprises the input port 510; part of the PNM interconnect 690; and the tap ports 515, 520, 535, 540. In addition, the 4-port tap 620 comprises a directional coupler (DC) 640 and splitters 610, 630, 650. The DC 640 couples the input line 505 to the output line 550 in a bidirectional manner. In addition, the DC 640 couples the splitter 630 to the input line 505, but not the output line 550, in a bidirectional manner as indicated by its internal lines. The DC 640 may have about a 15 dB loss. The splitter 630 splits signals to both the splitter 610 and the splitter 650. The splitter 610 splits signals to the tap port 1 515 and the tap port 3 520. The splitter 650 splits signals to the tap port 2 540 and the tap port 4 535. The splitters 610, 630, 650 are two-way splitters and may have about a 4 dB loss.

The remote PNM tap 660 comprises part of the PNM interconnect 690, the DR port 525, the DF port 530, and the output port 545. In addition, the remote PNM tap 660 comprises DCs 670, 680. The DC 670 couples the input line 505 to the output line 550 in a bidirectional manner. In addition, the DC 670 couples the DR port 525 to the output line 550, but not the input line 505, in a bidirectional manner as indicated by its internal lines. The DC 680 couples the input line 505 to the output line 550 in a bidirectional manner. In addition, the DC 680 couples the DF port 530 to the input line 505, but not the output line 550, in a bidirectional manner as indicated by its internal lines. The DCs 670, 680 may have about a 20 dB loss. The PNM interconnect 690 couples the 4-port tap 620 to the input line 505 and the remote PNM tap 660 and couples the remote PNM tap 660 to the output line 550.

As shown, the DC 670 and its corresponding DR port 525 are upstream from the DC 680 and its corresponding DF port 530. Alternatively, the DC 670 and its corresponding DR port 525 are downstream from the DC 680 and its corresponding DF port 530. As also shown, the faceplate 410 comprises the DCs 640, 670, 680. Alternatively, active circuitry is used instead of the DCs 640, 670, 680.

As also shown, the 4-port tap 620 and the remote PNM tap 660 are both part of the faceplate 410. In one alternative, the remote PNM tap 660 may be physically separate from the 4-port tap 620. However, adding the remote PNM tap 660 to the network 100 would disrupt service to the CMs 135, 150 as described above. In addition, adding the remote PNM tap 660 to the network 100 may add about 2.0 dB of insertion loss, which is 0.5 dB more than the 2.0 dB insertion loss due to replacing the faceplate 210 with the faceplate 410. In a second alternative, the faceplate comprises a non-directional tap port in place of the remote PNM tap 660 and a component external to the faceplate 410 couples to the non-directional tap port and performs the functions of the DR port 525 and the DF port 530. In addition, a coupler external to the faceplate 410 may couple to the non-directional tap port. While this alternative is simpler to manufacture, it may be less convenient to use with test equipment.

Figure 7:
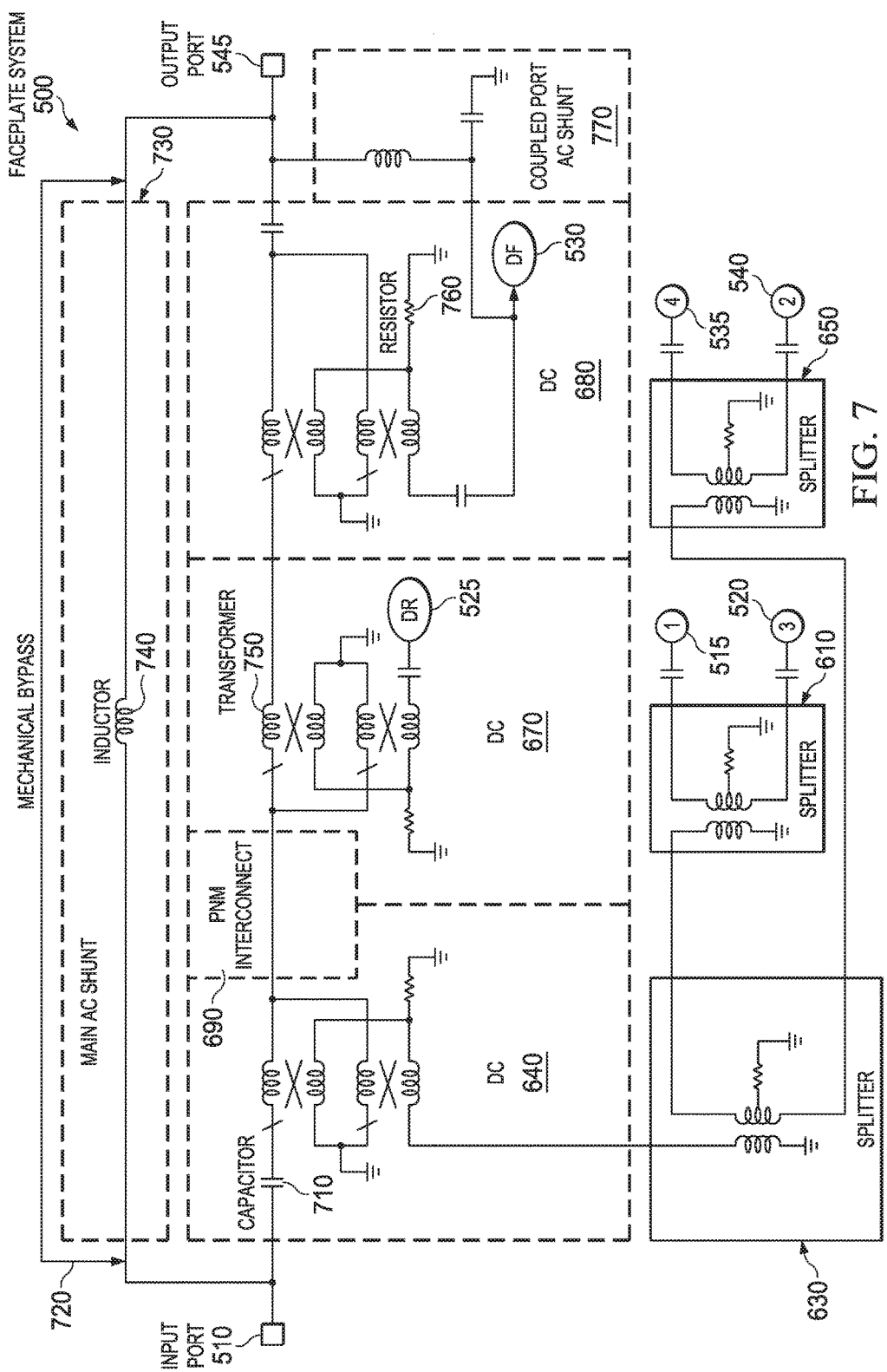
FIG. 7 is a detailed view of the faceplate system in FIG. 6 according to an embodiment of the disclosure.

FIG. 7 is a detailed view of the faceplate system 500 in FIG. 6 according to an embodiment of the disclosure. FIG. 7 shows the same components as FIG. 6. In addition, FIG. 7 shows sub-components of those components and shows that that the faceplate system 500 comprises a mechanical bypass 720, a main AC shunt 730, and a coupled port AC shunt 770.

The components of the faceplate system 500 comprise capacitors 710, inductors 740, transformers 750, and resistors 760 in various configurations. The capacitors 710 have any suitable capacitance values, the inductors 740 have any suitable inductance values, the transformers 750 have any suitable ratios and other values, and the resistors 760 have any suitable resistances. The mechanical bypass 720, the main AC shunt 730, and the coupled port AC shunt 770 provide power passing circuitry. The DC 670 associated with the DR port 525 may not pass network power because the connections for the DR port 525 may not be capable of handling that network power. The DC 680 associated with the DF port 530 passes network power. The DC 680 may receive that network power from either the input port 510 or the output port 545. In addition, the DF port 530 may not require any frequency below 102 megahertz (MHz), so it may be easy to filter the network power.

Figure 8:
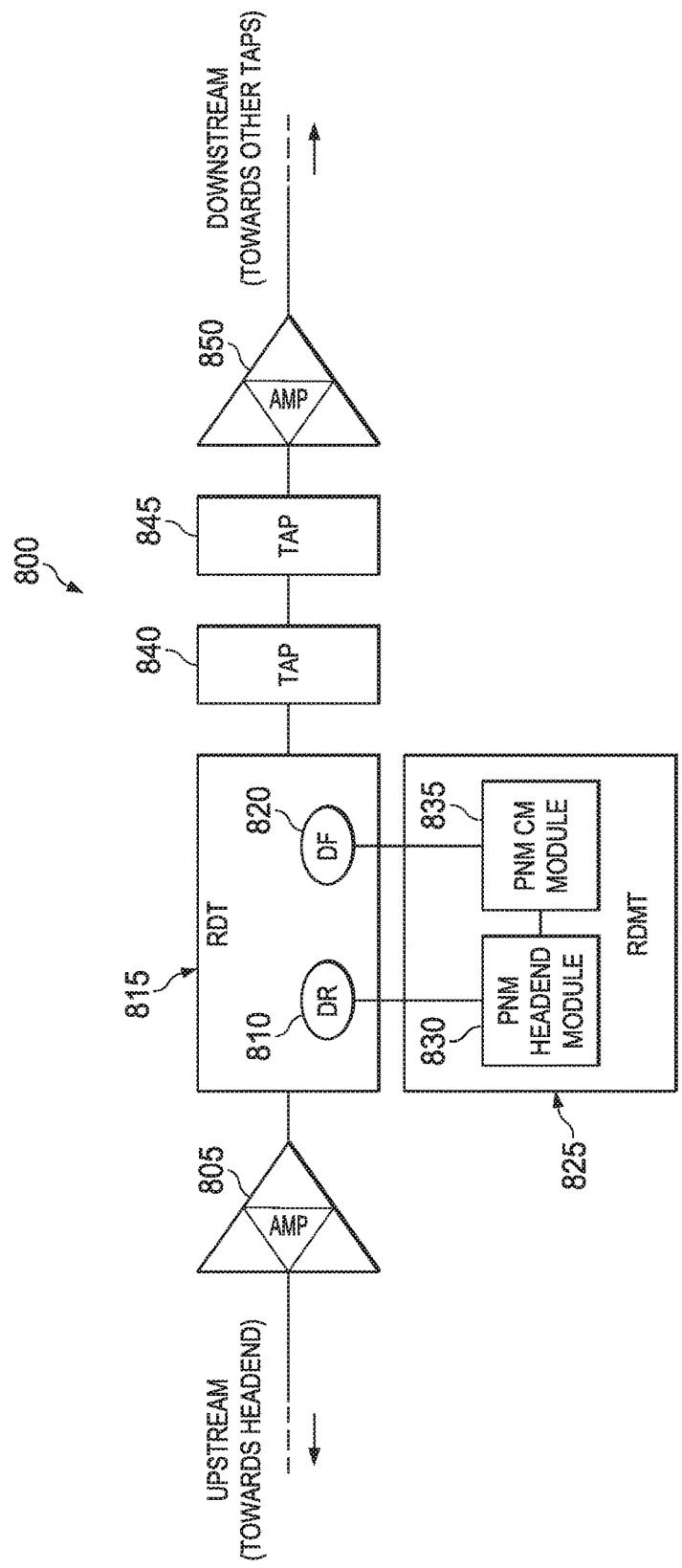
FIG. 8 is a schematic diagram of an HFC network analyzing system according to an embodiment of the disclosure.

FIG. 8 is a schematic diagram of an HFC network analyzing system 800 according to an embodiment of the disclosure. The system 800 shows part of a larger HFC network such as the HFC network 100. The system 800 comprises amps 805, 850 that are similar to the amps 125, 140; an RDT 815 that is similar to the RDT 400; and taps 840, 845 that are similar to the taps 130, 145. The RDT 815 is simplified to show only a DR port 810 that is similar to the DR port 525 and a DF port 820 that is similar to the DF port 530. In addition, the system 800 comprises an RDMT 825.

The RDMT 825 may comprise a hard, waterproof casing or another casing suitable for protecting the RDMT 825 from the outside environment. This allows the RDMT 825 to be embedded anywhere in the system 800. The RDMT 825 further comprises a PNM headend module 830 and a PNM CM module 835 to provide capabilities found in both headends and CMs, respectively.

The PNM headend module 830 is coupled to both the DR port 810 and the PNM CM module 835. First, the PNM headend module 830 monitors, captures, and analyzes upstream signals originating downstream from the RDT 815, for instance at the amp 850. Second, the PNM headend module 830 injects downstream test signals. Third, the PNM headend module 830 measures local noise at the RDT 815. The PNM headend module 830 may employ the PNM CM module 835 or an out-of-band means of communicating with the headend.

The PNM CM module 835 is coupled to the DF port 820 and the PNM headend module 830. First, the PNM CM module 835 monitors, captures, and analyzes downstream signals originating upstream from the RDT 815, for instance at the amp 805. Second, the PNM CM module 835 performs timing and mapping for the headend to work. Third, the PNM CM module 835 transmits to the headend the analyses from the PNM headend module 830. Fourth, the PNM CM module 835 receives analysis commands from the headend and forwards those commands to the PNM CM module 835. Fifth, the PNM CM module 835 injects upstream test signals to, for instance, facilitate DOCSIS 3.0 or DOCSIS 3.1 channel estimation.

The RDMT 825 may provide more advanced measurements when provided network timing and operating parameters. The RDMT 825 may conduct analyses during particular activities such as ranging bursts. The RDMT 825 may have a schedule or receive a schedule from the headend, and the schedule may indicate when to conduct analyses. During those analyses, the RDMT 825 may request that CMs transmit normal signals, transmit test signals, or not transmit at all. The RDMT 825 may be used in conjunction with other test components such as diagnostic CMs or embedded signal generators.

The RDMT 825 may require network power to operate. The RDMT 825 receives that network power from the DF port 820, which passes network power. The RDMT 825 is referred to as a remote device because it is remote from the headend and may be controlled in a manner that is remote from the headend. A technician may insert the RDMT 825 in the system 800 and use the RDMT 825 while present, or the technician may embed the RDMT 825 in the system 800 in a semi-permanent or permanent manner so that the technician need not be present while the RDMT 825 operates.

While the RDT 815 and the RDMT 825 are shown between the amp 805 and the tap 840, the RDT 815 and the RDMT 825 may be placed in any suitable location in the system 800 or the larger network. In other words, the RDT 815 and the RDMT 825 may be placed at any middlepoint in the system 800 or the larger network. This versatility ensures that the RDT 815 and the RDMT 825 may determine the location of impairments. While the RDMT 825 is shown as being coupled to the RDT 815 via the DR port 810 and the DF port 820, the RDMT 825 may connect to the system 800 in other ways. For instance, the RDMT 825 may couple to a splitter on a coaxial cable line or may couple to another component of the system 800.

Figure 9:
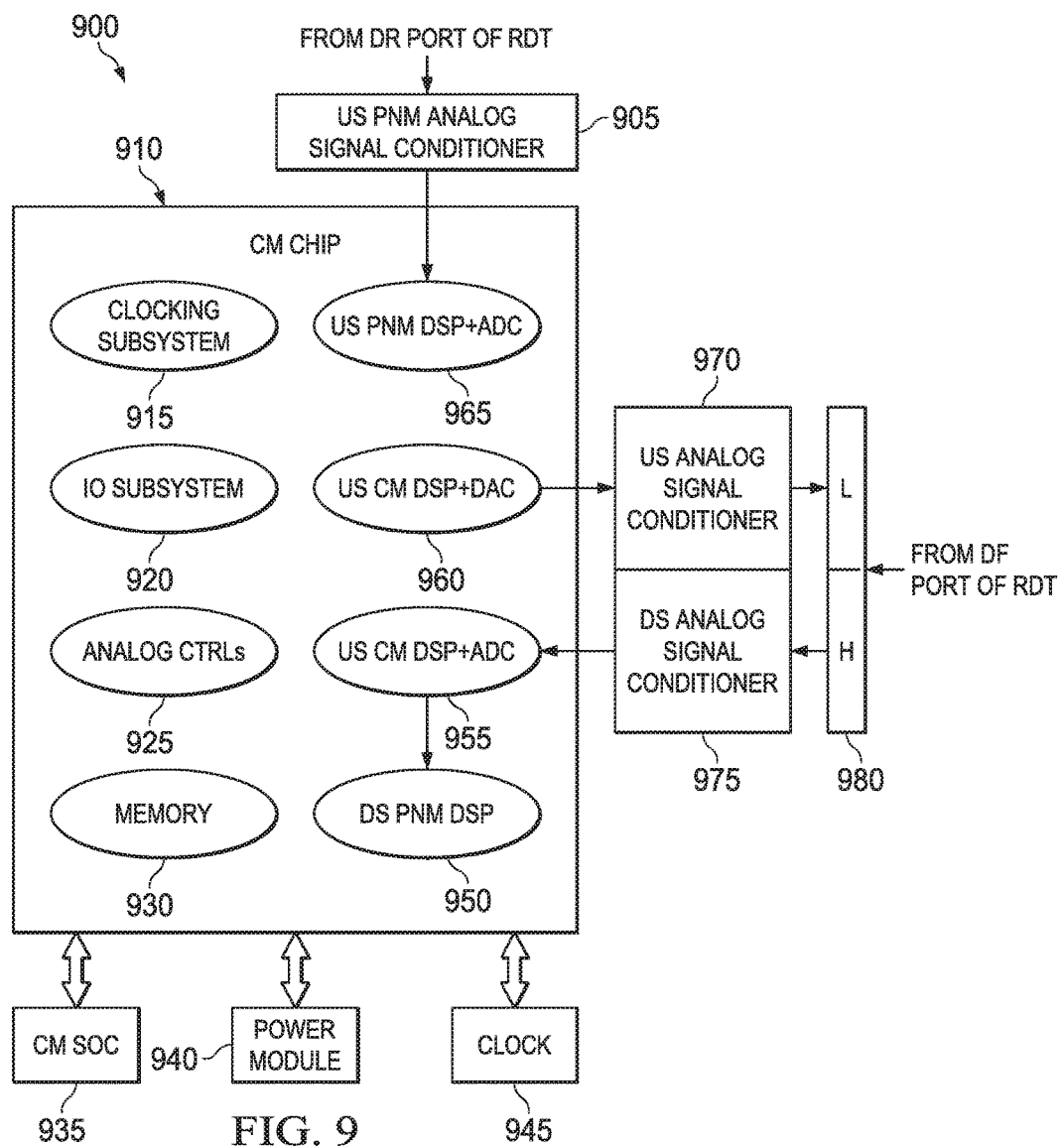
FIG. 9 is a schematic diagram of a remote diagnostic management tool (RDMT) according to an embodiment of the disclosure.
Figure 10:
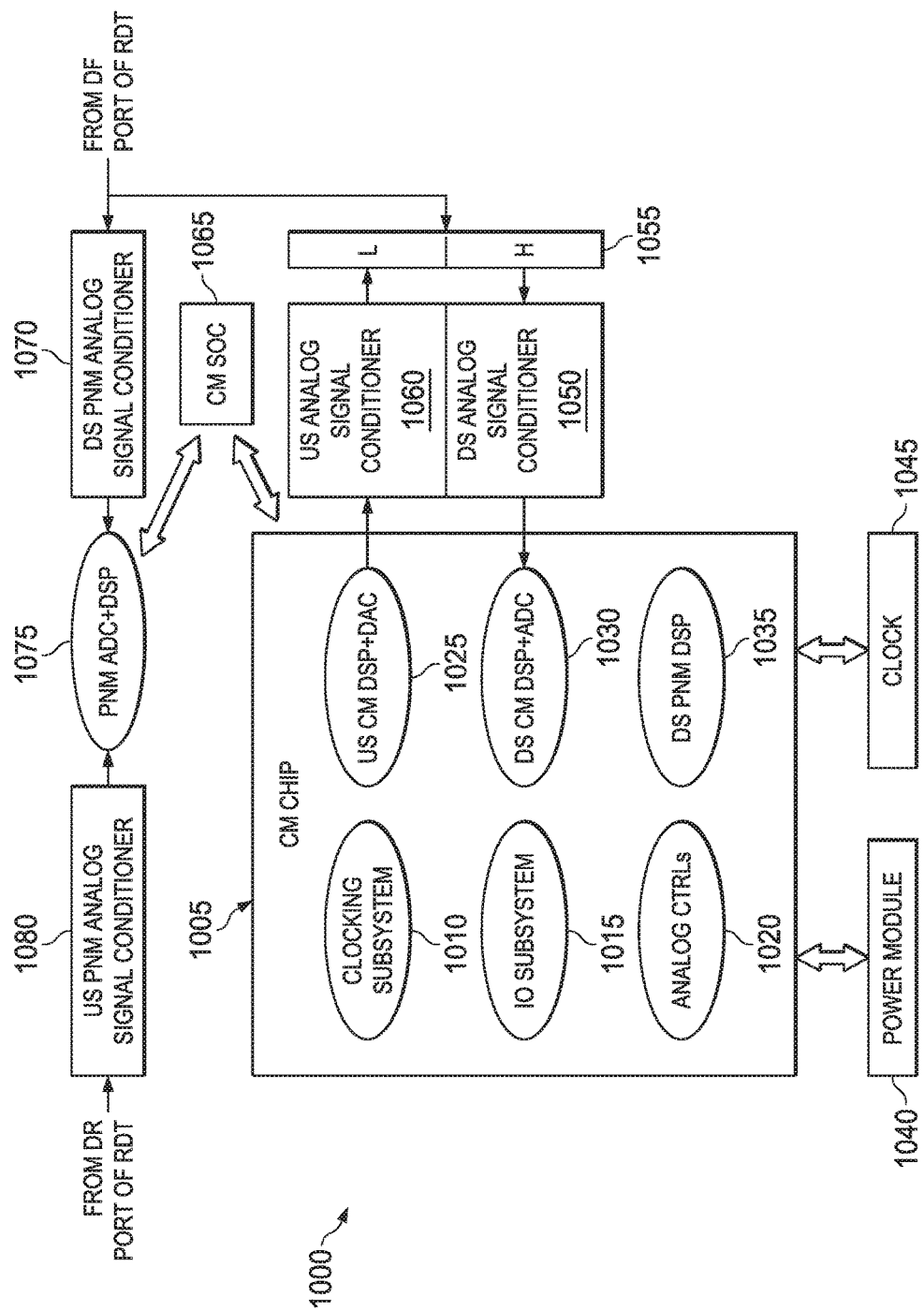
FIG. 10 is a schematic diagram of an RDMT according to another embodiment of the disclosure.
Figure 11:
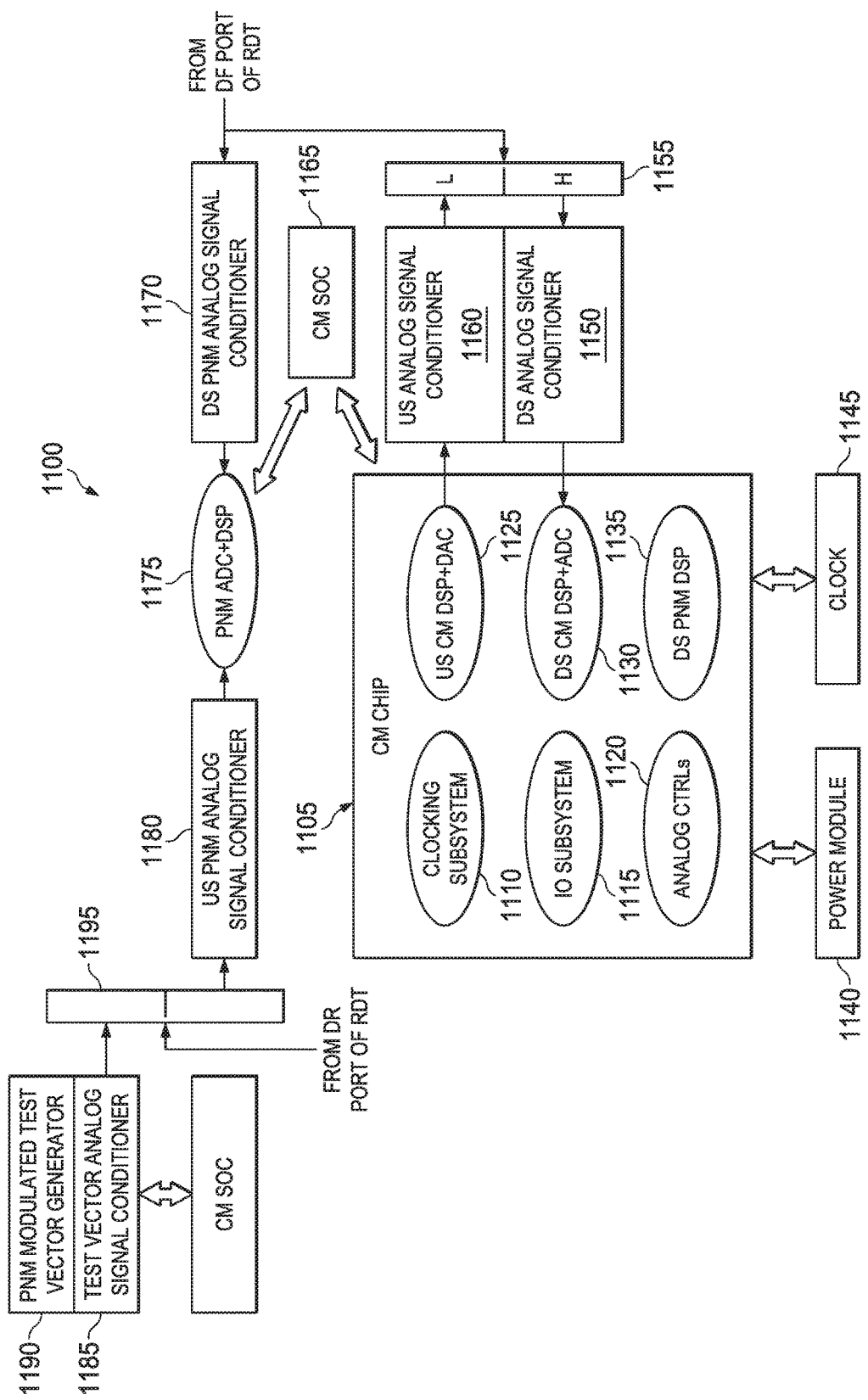
FIG. 11 is a schematic diagram of an RDMT according to yet another embodiment of the disclosure.

In FIG. 8, the PNM headend module 830 and the PNM CM module 835 are coupled to each other in a common device, the RDMT 825. A headend chip may implement the PNM headend module 830, and a CM chip may implement the PNM CM module 835. FIGS. 9-11 demonstrate different approaches to implement the PNM headend module 830 and the PNM CM module 835. In those approaches, CM chips implement both the PNM headend module 830 and the PNM CM module 835. A person of ordinary skill in the art understands how to implement the individual components described. Other suitable approaches may also implement the PNM headend module 830 and the PNM CM module 835.

FIG. 9 is a schematic diagram of an RDMT 900 according to an embodiment of the disclosure. The RDMT 900 comprises a US PNM analog signal conditioner 905, a CM chip 910, a CM system-on-chip (SOC) 935, a power module 940, a clock 945, a US analog signal conditioner 970, a DS analog signal conditioner 975, and a diplexer 980. The CM chip 910 comprises a clocking subsystem 915, an input-output (IO) subsystem 920, analog controls (CTRLs) 925, a memory 930, a US PNM digital signal processor (DSP) & analog-to-digital converter (ADC) 965, a US CM DSP & DAC 960, a DS CM DSP & ADC 955, and a DS PNM DSP 950. The RDMT 900 has a PNM capability internal to the CM chip 910, which may require switching signal filters to dynamically route downstream signals and upstream signals. Though downstream signals from the DF port of the RDT are shown entering the diplexer 980 and upstream signals from the DR port of the RDT are shown entering the US PNM analog signal conditioner 905, the downstream signals and the upstream signals may instead together enter a splitter within the RDMT 900 and then separate into their respective paths.

FIG. 10 is a schematic diagram of an RDMT 1000 according to another embodiment of the disclosure. The RDMT 1000 comprises a CM chip 1005, a power module 1040, a clock 1045, a DS analog signal conditioner 1050, a diplexer 1055, a US analog signal conditioner 1060, a CM SOC 1065, a DS PNM analog signal conditioner 1070, a PNM ADC & DSP 1075, and a US PNM analog signal conditioner 1080. The CM chip 1005 comprises a clocking subsystem 1010, an IO subsystem 1015, analog CTRLs 1020, a DS PNM DSP 1035, a DS CM DSP & ADC 1030, and a US CM DSP & DAC 1025. Unlike the RDMT 900 in FIG. 9, the RDMT 1000 has a PNM capability external to the CM chip 1005. Furthermore, the PNM ADC & DSP 1075 samples both downstream signals from the DS PNM analog signal conditioner 1070 and upstream signals from the US PNM analog signal conditioner 1080. This approach may more fully capture harmonic energy, which may be filtered out due to bandwidth limitations of the CM chip 1005 or the diplexer 1055. Though downstream signals from the DF port of the RDT are shown entering the DS PNM analog signal conditioner 1070 and the diplexer 1055 and upstream signals from the DR port of the RDT are shown entering the US PNM analog signal conditioner 1080, the downstream signals and the upstream signals may instead together enter a splitter within the RDMT 1000 and then separate into their respective paths.

FIG. 11 is a schematic diagram of an RDMT 1100 according to yet another embodiment of the disclosure. The RDMT 1100 comprises a CM chip 1105, a power module 1140, a clock 1145, a DS analog signal conditioner 1150, a diplexer 1155, a US analog signal conditioner 1160, a CM SOC 1165, a DS PNM analog signal conditioner 1170, a PNM ADC & DSP 1175, and a US PNM analog signal conditioner 1180 like the RDMT 1000 in FIG. 10. The CM chip 1105 comprises a clocking subsystem 1110, an I/O subsystem 1115, analog CTRLs 1120, a DS PNM DSP 1135, a DS CM DSP & ADC 1130, and a US CM DSP & DAC 1125 like the RDMT 1000 in FIG. 10. Unlike the RDMT 1000 in FIG. 10, the RDMT 1100 further comprises a splitter 1195, a test vector analog signal conditioner 1185, and a PNM modulated test vector generator 1190. The splitter 1195 splits upstream signals from the DR port of the RDT to the test vector analog signal conditioner 1185 and the US PNM analog signal conditioner 1180. Thus, unlike the RDMT 1000 in FIG. 10, the RDMT 1100 has PNM test channel insertion external to the CM chip 1105. Though downstream signals from the DF port of the RDT are shown entering the DS PNM analog signal conditioner 1170 and the diplexer 1155 and upstream signals from the DR port of the RDT are shown entering the splitter 1195, the downstream signals and the upstream signals may instead together enter a splitter within the RDMT 1100 and then separate into their respective paths.

Figure 12:
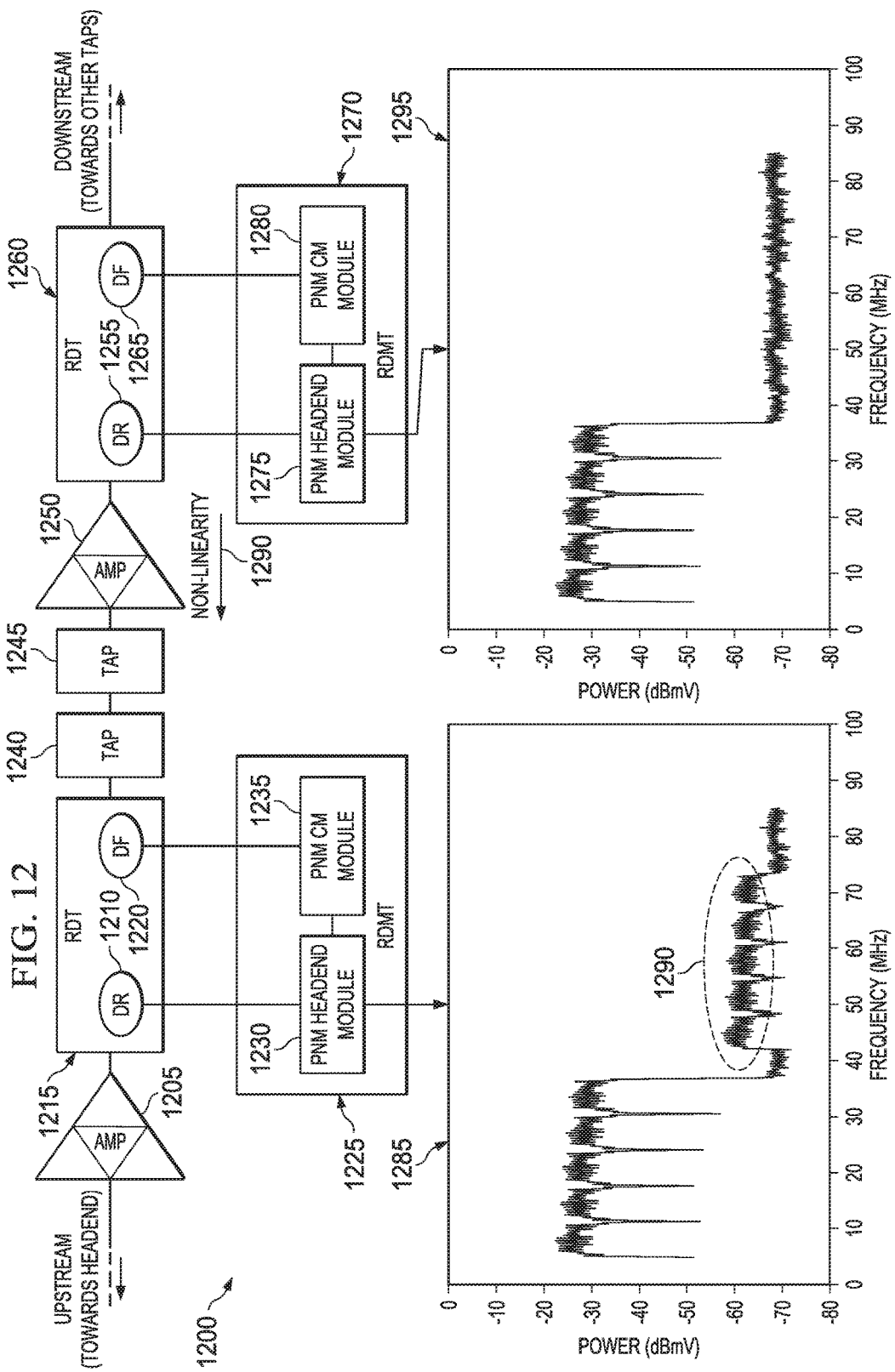
FIG. 12 is a schematic diagram of an upstream HFC network analyzing system analyzing a non-linearity according to an embodiment of the disclosure.

FIG. 12 is a schematic diagram of an upstream HFC network analyzing system 1200 analyzing a non-linearity according to an embodiment of the disclosure. The system 1200 shows part of a larger HFC network such as the HFC network 100. The system 1200 comprises amps 1205, 1250; RDTs 1215, 1260; RDMTs 1225, 1270; and taps 1240, 1245. Those components are similar to their corresponding components in FIG. 8. In addition, the system 1200 shows graphs 1285, 1295 to demonstrate how the RDMTs 1225, 1270 may analyze the system 1200.

The RDMT 1225 outputs the graph 1285 by capturing and analyzing, via the DR port 1210 and the PNM headend module 1230, an upstream signal originating downstream from the RDT 1215. The x-axis of the graph 1285 represents frequency in megahertz (MHz), and the y-axis of the graph 1285 represents power in decibel millivolts (dBmV). The RDMT 1270 outputs the graph 1295 by capturing and analyzing, via the DR port 1255 and the PNM headend module 1275, an upstream signal originating downstream from the RDT 1260. The x-axis of the graph 1295 represents frequency in MHz, and the y-axis of the graph 1295 represents power in dBmV.

As shown, the graph 1295 has no irregularities such as non-linearities, indicating that the components of the network that are downstream from the RDT 1260 are functioning properly. However, the graph 1285 comprises a non-linearity 1290, indicating that at least one component of the network that is downstream from the RDT 1215 is faulty. Taken together, the graphs 1285, 1295 indicate that at least one component between the RDT 1215 and the RDT 1260 is faulty. In this case, the nature of the non-linearity 1290 may suggest that the amp 1250 is non-linear or otherwise faulty. Nonetheless, if the taps 1240, 1245 are RDTs, then another RDMT may be coupled to the DR ports of the taps 1240, 1245 to narrow the portion of the system 1200 that may contain the faulty component and thus to identify the faulty component.

Figure 13:
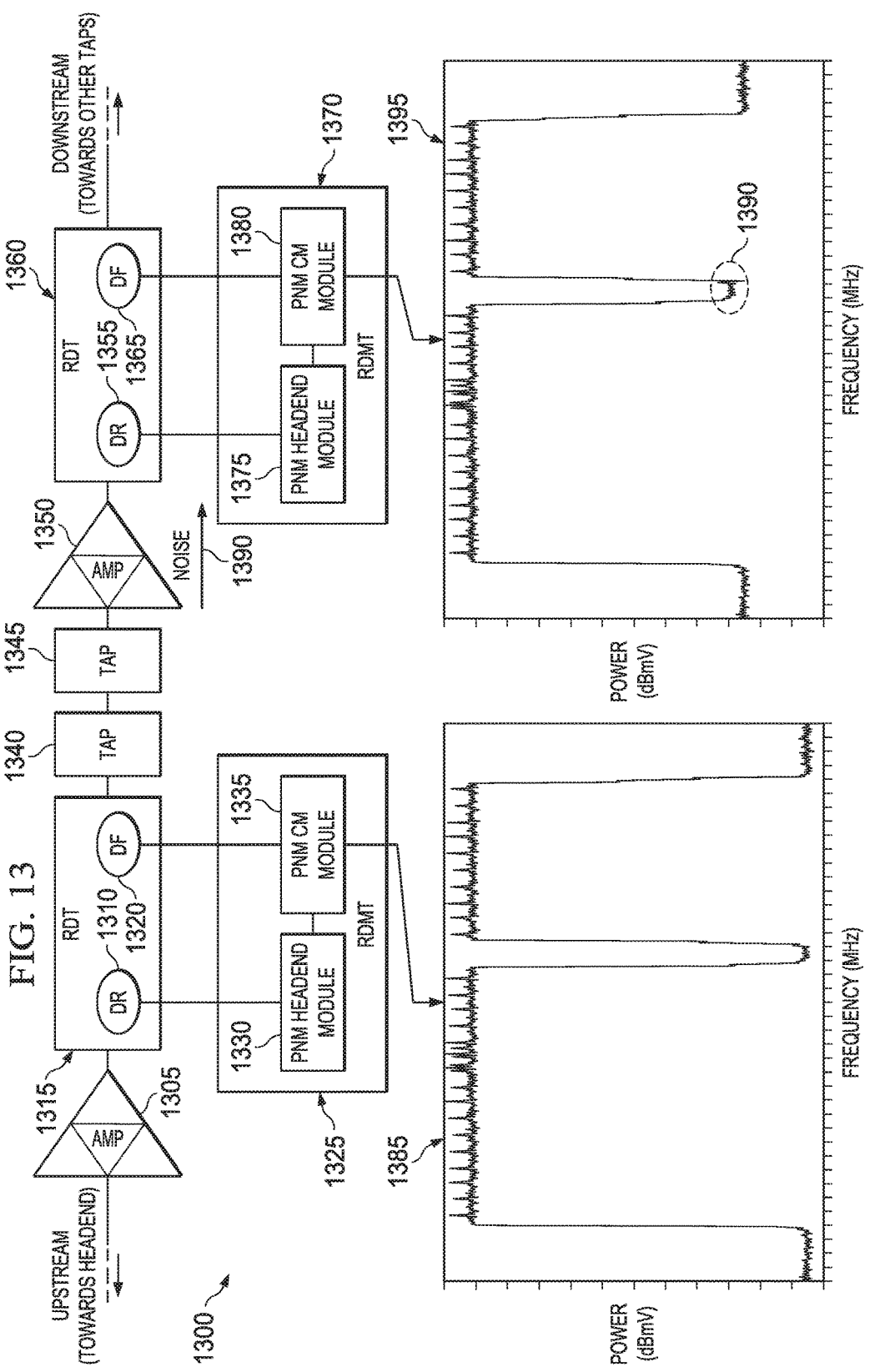
FIG. 13 is a schematic diagram of a downstream HFC network analyzing system analyzing an elevated noise floor according to an embodiment of the disclosure.

FIG. 13 is a schematic diagram of a downstream HFC network analyzing system 1300 analyzing an elevated noise floor according to an embodiment of the disclosure. The system 1300 is similar to the system 1200. Unlike in the system 1200, the RDMT 1325 outputs a graph 1385 by capturing and analyzing, via the DF port 1320 and the PNM CM module 1335, a downstream signal originating upstream from the RDT 1315. The x-axis of the graph 1385 represents frequency in MHz, and the y-axis of the graph 1385 represents power in dBmV. The RDMT 1370 outputs a graph 1395 by capturing and analyzing, via the DF port 1365 and the PNM CM module 1380, a downstream signal originating upstream from the RDT 1360. The x-axis of the graph 1395 represents frequency in MHz, and the y-axis of the graph 1395 represents power in dBmV.

As shown, the graph 1385 has no irregularities such as an elevated noise floor, indicating that the components of the network that are upstream from the RDT 1315 are functioning properly. However, the graph 1395 comprises an elevated noise floor 1390, indicating that at least one component of the network that is upstream from the RDT 1360 is faulty. Taken together, the graphs 1385, 1395 indicate that at least one component between the RDT 1315 and the RDT 1360 is faulty. In this case, the nature of the elevated noise floor 1390 may suggest that the amp 1350 is noisy or otherwise faulty. Nonetheless, if the taps 1340, 1345 are RDTs, then an RDMT may be coupled to the DF ports of the taps 1240, 1245 to narrow the portion of the system 1300 that may contain the faulty component and thus to identify the faulty component.

The RDMTs 825, 900, 1000, 1100, 1225, 1270, 1325, 1370 perform various ENM techniques, including swept spectrum measurement using DOCSIS techniques, fast Fourier transform (FFT) spectrum measurement, FBC for both the frequency band and the time band, equalization impulse response, and full-signal demodulation. One may perform a frequency-domain capture by combining the output of multiple FFT captures for consecutive frequency blocks. It is preferred that such a capture be for the full band, but that may not be possible due to hardware limitations. An ENM controller, which is described below, may command the RDMTs 825, 900, 1000, 1100, 1225, 1270, 1325, 1370 to perform the ENM techniques as a result of triggers, a schedule, or DOCSIS timing. The RDMTs 825, 900, 1000, 1100, 1225, 1270, 1325, 1370 may make consecutive measurements or closely-timed measurements. The ENM controller may tag the measurements with the time of day or the DOCSIS time. The following figures and their corresponding descriptions describe some examples of ENM techniques. The examples focus on upstream signals because upstream signals are the most challenging for MSOs to analyze.

FIG. 14 is a schematic diagram of an upstream HFC network analyzing system 1400 analyzing an impulse noise according to an embodiment of the disclosure. The system 1400 is similar to the system 1200. Unlike the system 1200, the system 1400 comprises CMs 1497, 1499. Graphs 1485, 1495 represent FFT captures.

As shown, the graph 1495 has no irregularities such as an impulse noise, indicating that the components of the network that are downstream from the RDT 1460 are functioning properly. However, the graph 1485 comprises an impulse noise 1490, indicating that at least one component of the network that is downstream from the RDT 1415 is faulty. The impulse noise 1490 is characterized by the elevated signal level indicated by the brackets on both sides of the impulse, or peak, in the upstream band. Because the taps 1440, 1445 block upstream signals from the CMs 1497, 1499 from propagating downstream, the impulse noise 1490 must enter the system 1400 between the amp 1405 and the amp 1450. In this case, the nature of the impulse noise 1490 may suggest that one of the CMs 1497 is faulty. Though the graphs 1485, 1495 represent FFT captures, an FBC of the time domain would also be appropriate to determine the impulse noise 1490.

FIG. 15 is a schematic diagram of a downstream HFC network analyzing system 1500 analyzing an LTE signal according to an embodiment of the disclosure. The system 1500 is similar to the system 1300. Unlike the system 1300, the system 1500 comprises CMs 1597 and an LTE base station 1599. A graph 1585 represents FFT captures.

As shown, the graph 1585 comprises a downstream signal 1593, which is typical of downstream signals originating upstream from the RDT 1560. However, the graph 1585 also shows an LTE signal 1590. LTE uses a frequency band at or around 700 MHz, which corresponds to the downstream band of HFC networks. The LTE signal 1590 may travel from the LTE base station 1599, leak into a faulty CM 1597 due to loose or corroded connectors in the faulty CM 1597, and proceed upstream. The RDMT 1570 receives the LTE signal 1590 via the DF port 1565 and the PNM CM module 1580. Thus, the presence of the LTE signal 1590 at the RDMT 1570 indicates that the faulty CM 1597 is upstream from the RDT 1560. This issue is important for the MSO to diagnose because this issue indicates that the downstream signals in the system 1500 may also be leaking out and interfering with LTE signals, which may violate various regulations.

Downstream LTE signals, which are signals from the LTE base station 1599 to user equipments (UEs), are constant carrier signals. Upstream LTE signals, which are signals from the UEs to the LTE base station 1599, are burst-mode signals. As a result, downstream LTE signals may be more pervasive in the system 1500, but also easier to capture and analyze.

Figure 16:
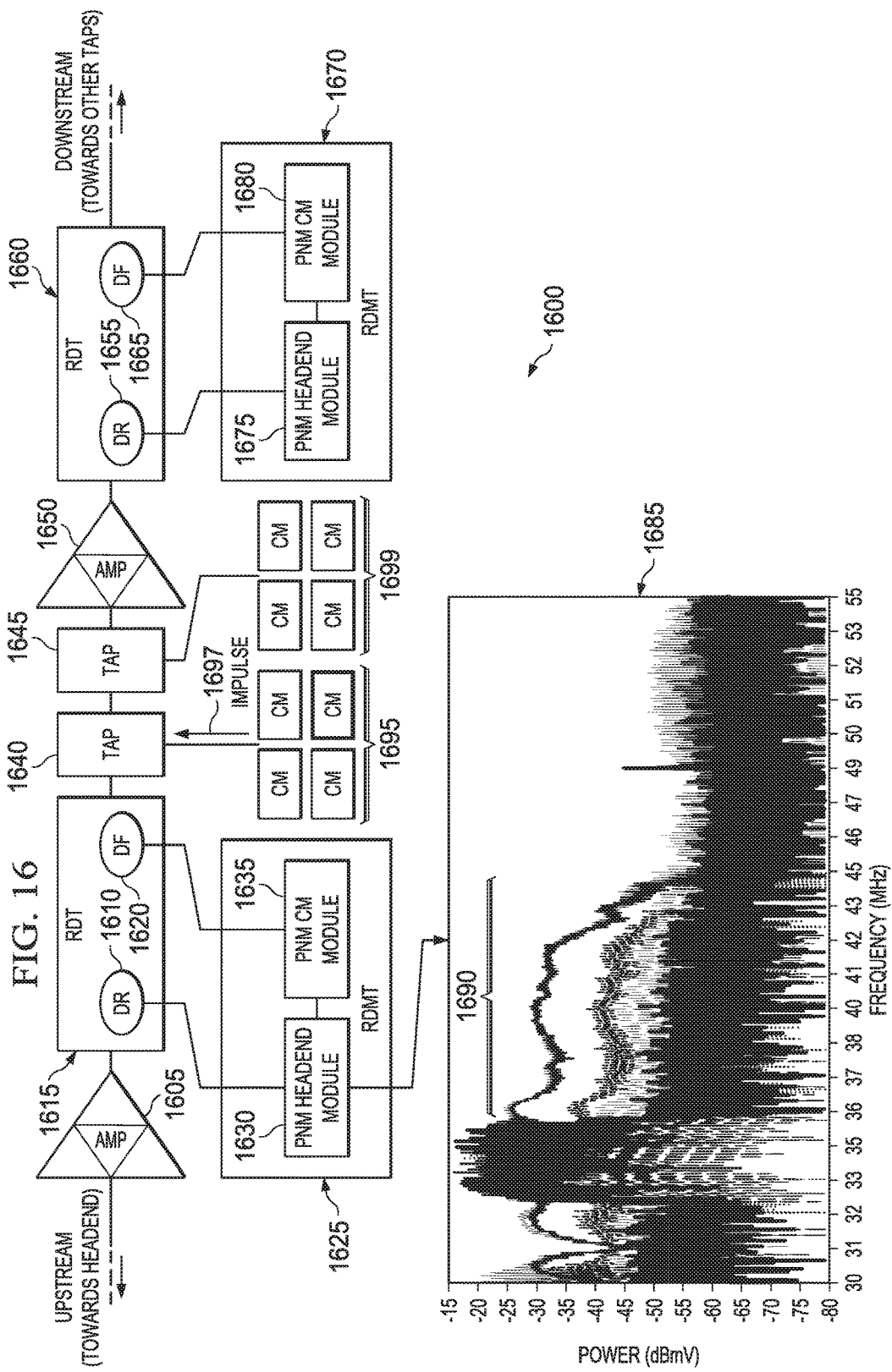
FIG. 16 is a schematic diagram of an upstream HFC network analyzing system analyzing an impulse duration according to an embodiment of the disclosure.

FIG. 16 is a schematic diagram of an upstream HFC network analyzing system 1600 analyzing an impulse duration according to an embodiment of the disclosure. The system 1600 is similar to the system 1400. A graph 1685 represents FFT captures.

The graph 1685 shows an impulse duration 1690, as well as other impulse durations. If an impulse such as an impulse 1697 from one of the CMs 1695 lasts longer than an FFT frame, then consecutive FFT frames will show elevated broadband noise, meaning an elevated signal level across a large frequency range. The signal level of the elevated broadband noise is the product of the power of the signal impulse times the fraction of the FFT frame overlapping the impulse signal. If the impulse power level is relatively constant from one event to the next event, the impulse length may be estimated from the distribution of levels in the FFT captures. While an FBC in the time domain would be an easier way to measure the impulse duration 1690, MSOs have a strong preference for frequency domain analyses.

FIG. 17 is a schematic diagram of an upstream HFC network analyzing system 1700 analyzing impulse noise power and a non-linearity according to an embodiment of the disclosure. The system 1700 is similar to the system 1600. A graph 1785 represents FFT captures. As shown, the graph 1785 comprises ingress noise power 1790 and a non-linearity with harmonic power 1793 as a result of an impulse 1797.

Figure 18:
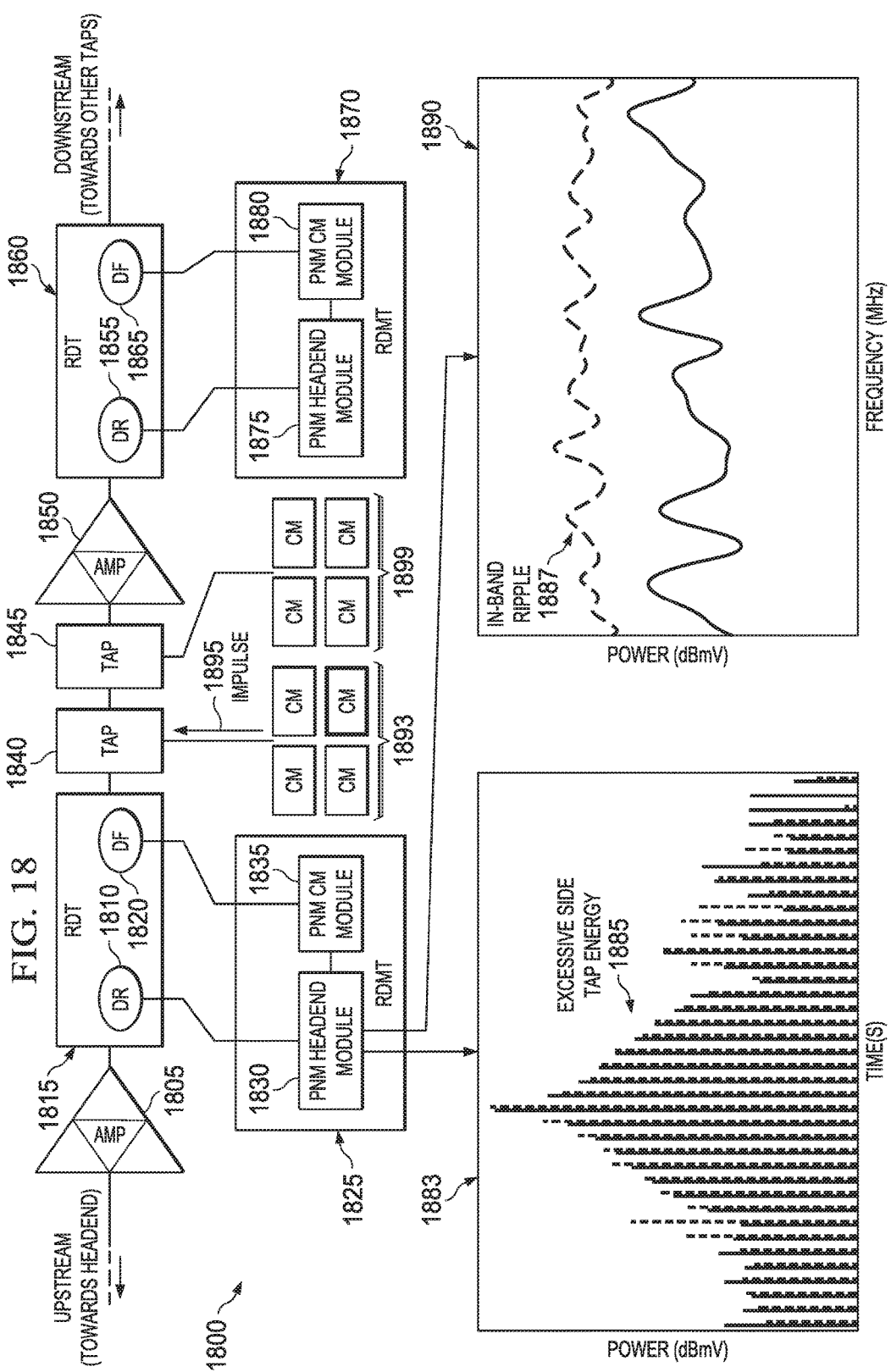
FIG. 18 is a schematic diagram of an upstream HFC network analyzing system analyzing micro-reflections according to an embodiment of the disclosure.

FIG. 18 is a schematic diagram of an upstream HFC network analyzing system 1800 analyzing micro-reflections according to an embodiment of the disclosure. The system 1800 is similar to the systems 1600, 1700. Graphs 1883, 1890 illustrate the use of upstream demodulation on a ranging burst to analyze micro-reflections in the upstream direction and to provide equalization and pre-equalization coefficients. Specifically, the graph 1883 illustrates received signal power as a function of time and provides a quantitative measurement of the signal time dispersion that is a result of channel impairment at the point in the system 1800 where the RDT 1815 is located. Similarly, the graph 1890 illustrates received signal power as a function of time and the effect that the time dispersive channel has in the frequency domain. The coefficients in the graph 1883 provide a time domain view of a frequency ripple in the upstream direction that is shown in the graph 1890. Secondary peaks in a plot of the equalization coefficients in the graph 1883 show a round-trip delay of a micro-reflection. If the RDMT 1870 does not show those characteristics in the upstream direction, then the MSO may determine that source of the micro-reflection is between an amp 1805 and an amp 1850. The MSO can make similar determinations any time it inserts an RDMT for each cascade of components following an amp.

Figure 19:
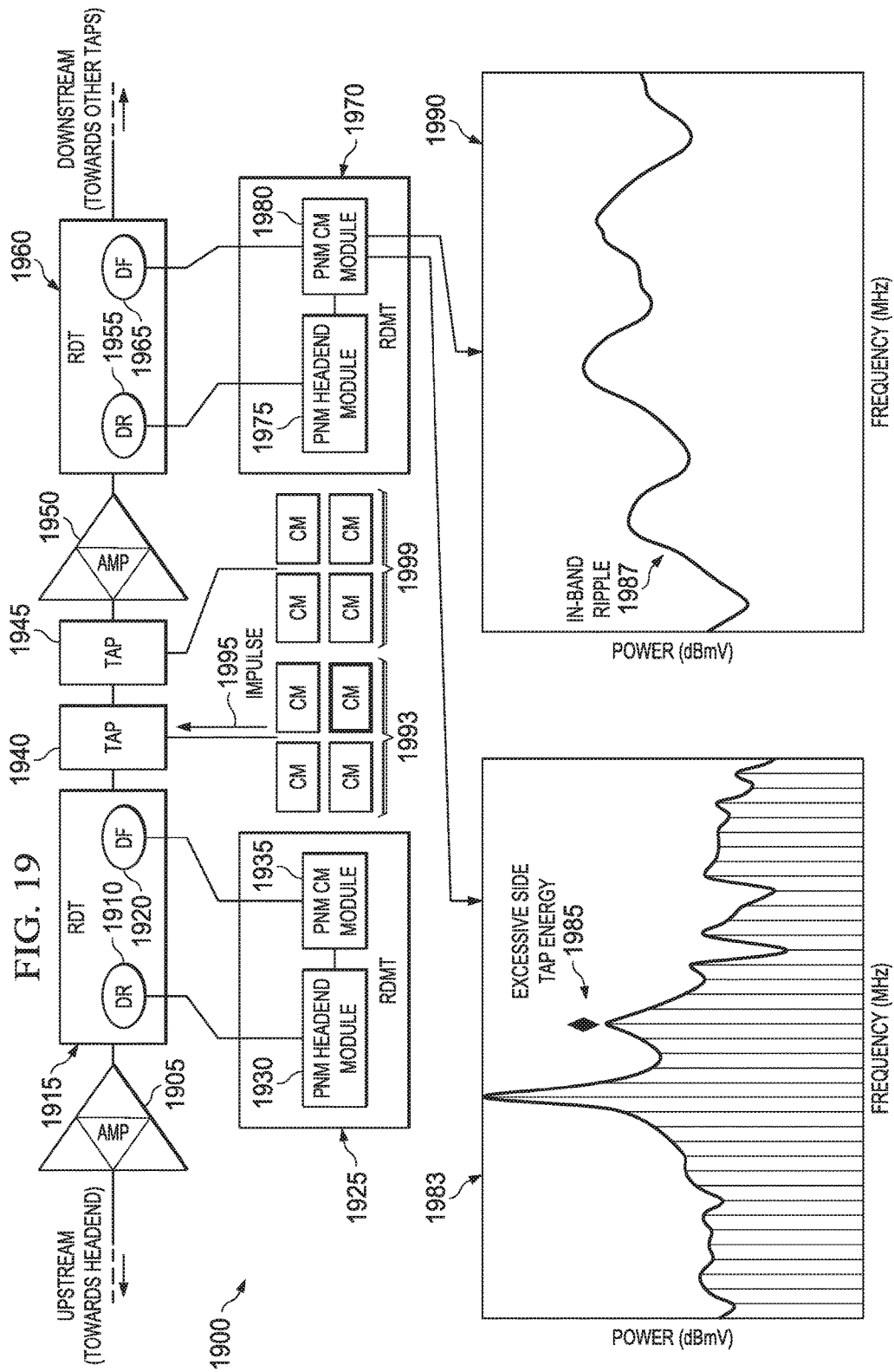
FIG. 19 is a schematic diagram of a downstream HFC network analyzing system analyzing micro-reflections according to an embodiment of the disclosure.

FIG. 19 is a schematic diagram of a downstream HFC network analyzing system 1900 analyzing micro-reflections according to an embodiment of the disclosure. The system 1900 is similar to the system 1800. Unlike the system 1800, the system 1900 analyzes the downstream direction. Graphs 1983, 1990 illustrate the use of upstream demodulation on a ranging burst to analyze micro-reflections in the upstream direction and to provide equalization and pre-equalization coefficients. If the RDMT 1925 does not show those characteristics in the downstream direction, then the MSO may determine that source of the micro-reflection is between an amp 1905 and an amp 1950.

Figure 20:
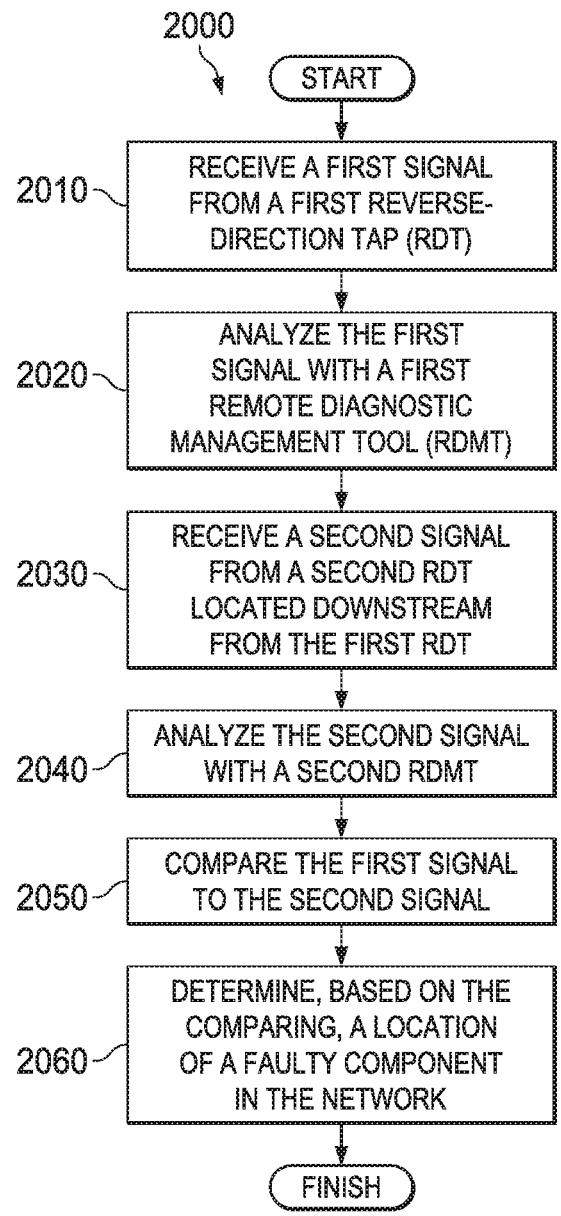
FIG. 20 is a flowchart illustrating a method of determining a location of a faulty component in a network according to an embodiment of the disclosure.

FIG. 20 is a flowchart illustrating a method 2000 of determining a location of a faulty component in a network according to an embodiment of the disclosure. The method 2000 may be implemented in, for instance, the systems 1200, 1300, 1400. At step 2010, a first signal is received from a first RDT. For instance, the RDT 1215 receives the first signal. At step 2020, the first signal is analyzed with a first RDMT. For instance, the RDMT 1225 analyzes the first signal. At step 2030, a second signal is received from a second RDT located downstream from the first RDT. For instance, the RDT 1260 receives the second signal. At step 2040, the second signal is analyzed with a second RDMT. For instance, the RDMT 1270 analyzes the second signal. At step 2050, the first signal is compared to the second signal. For instance, an MSO or a technician associated with the MSO compares the first signal to the second signal. Finally, at step 2060, a location of a faulty component in the network is determined based on the comparing. For instance, the MSO or the technician determines that the location is associated with the amp 1250.

Figure 21:
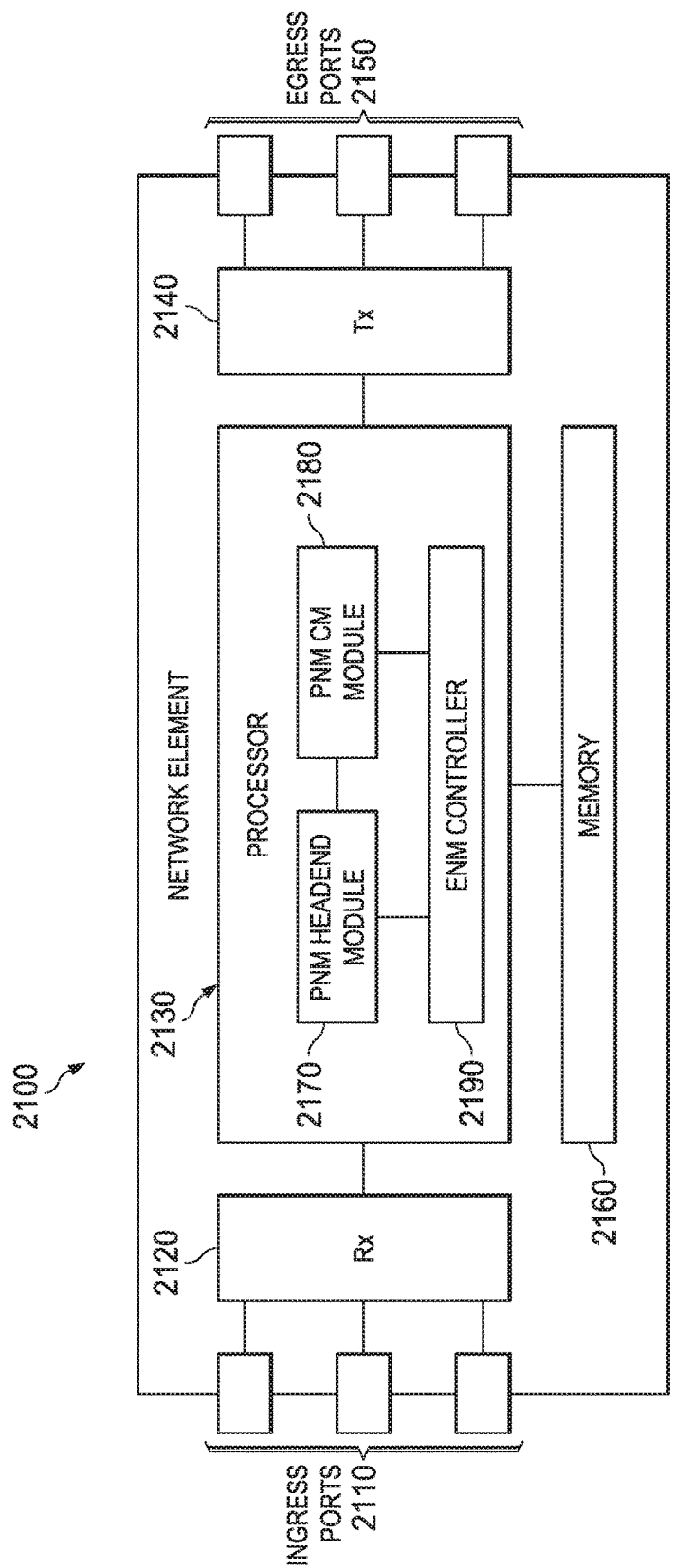
FIG. 21 is a schematic diagram of a network device according to an embodiment of the disclosure.

FIG. 21 is a schematic diagram of a network device 2100 according to an embodiment of the disclosure. The device 2100 is suitable for implementing the disclosed embodiments as described below. The device 2100 comprises ingress ports 2110 and receiver units (Rx) 2120 for receiving data; a processor, logic unit, or central processing unit (CPU) 2130 to process the data; transmitter units (Tx) 2140 and egress ports 2150 for transmitting the data; and a memory 2160 for storing the data. The device 2100 may also comprise optical-to-electrical (OE) components and electrical-to-optical (EO) components coupled to the ingress ports 2110, the receiver units 2120, the transmitter units 2140, and the egress ports 2150 for egress or ingress of optical or electrical signals.

The processor 2130 is implemented by hardware and software. The processor 2130 may be implemented as one or more CPU chips, cores (e.g., as a multi-core processor), field-programmable gate arrays (FPGAs), application specific integrated circuits (ASICs), and digital signal processors (DSPs). The processor 2130 is in communication with the ingress ports 2110, receiver units 2120, transmitter units 2140, egress ports 2150, and memory 2160. The processor 2130 comprises a PNM headend module 2170, a PNM CM module 2180, and an ENM controller 2190.

The PNM headend module 2170, the PNM CM module 2180, and the ENM controller 2190 assist in implementing the disclosed embodiments described above. For instance, the PNM headend module 2170 implements the PNM headend modules 1230, 1275; the PNM CM module 2180 implements the PNM CM modules 1235, 1280; and the ENM controller 2190 commands the RDMTs 1225, 1270 to perform the ENM techniques described above. The inclusion of the PNM headend module 2170, the PNM CM module 2180, and the ENM controller 2190 therefore provides a substantial improvement to the functionality of the device 2100 and effects a transformation of the device 2100 to a different state. Alternatively, the PNM headend module 2170, the PNM CM module 2180, and the ENM controller 2190 are implemented as instructions stored in the memory 2160 and executed by the processor 2130.

The memory 2160 comprises one or more disks, tape drives, and solid-state drives and may be used as an overflow data storage device, to store programs when such programs are selected for execution, and to store instructions and data that are read during program execution. The memory 2160 may be volatile and non-volatile and may be read-only memory (ROM), random-access memory (RAM), ternary content-addressable memory (TCAM), and static random-access memory (SRAM).

The term "about" means a range including ±10% of the subsequent number, unless otherwise stated. When two components are "directly coupled," the two components have between them no other components other than a line, trace, or other medium. When two components are "indirectly coupled," the two components may have between them such other components. The term "coupled" and its derivatives means either directly coupled or indirectly coupled.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A hybrid fiber-coaxial (HFC) network comprising:
a headend;
a first amplifier coupled to the headend;
a second amplifier; and
a tap coupled to the first amplifier and the second amplifier so that the first amplifier is positioned between the headend and the tap and the tap is positioned between the first amplifier and the second amplifier, the tap is configured to couple to a plurality of cable modems (CMs), and the tap comprises:
  a diagnostic forward (DF) port configured to:
    receive a downstream signal from the first amplifier, and
    inject an upstream test signal in an upstream direction for analysis at the headend of a first fault occurring upstream from the tap; and
  a diagnostic reverse (DR) port configured to:
    receive an upstream signal from the second amplifier, and inject a downstream test signal in a downstream direction for analysis at one of the CMs of a second fault occurring downstream from the tap.

2. The HFC network of claim 1, further comprising an input line coupled to the first amplifier and the tap.

3. The HFC network of claim 1, further comprising an output line coupled to the tap and the second amplifier.

4. The HFC network of claim 1, wherein the tap is an immobile fixture of the HFC network.

5. The HFC network of claim 1, wherein the DF port is further configured to further receive the downstream signal without passing the downstream signal to the CMs, and wherein the DR port is further configured to further receive the upstream signal without passing the upstream signal to the headend.

6. A remote diagnostic management tool (RDMT) comprising:
   a Proactive Network Management (PNM) headend module configured to:
      couple to a diagnostic reverse (DR) port of a reverse-direction tap (RDT) located remote from a headend,
      provide diagnostic and testing functionality,
      monitor, capture, and analyze upstream signals originating downstream from the RDT and via the DR port,
      inject downstream test signals into the DR port, and
      measure local noise at the RDT; and
   a PNM cable modem (CM) module coupled to the PNM headend module and configured to:
      couple to a diagnostic forward (DF) port of the RDT,
      provide diagnostic and testing functionality,
      monitor, capture, and analyze downstream signals originating upstream from the RDT and via the DF port,
      perform timing and mapping for the headend, and
      inject upstream test signals into the DF port.

7. The RDMT of claim 6, wherein the PNM CM module is further configured to:
   receive analysis commands from the headend;
   forward the analysis commands to the PNM headend module;
   receive analyses from the PNM headend module; and
   forward the analyses to the headend.

8. The RDMT of claim 6, wherein the headend is a cable modem termination system (CMTS).

9. A method implemented in a hybrid fiber-coaxial (HFC) network, the method comprising:
   receiving a first signal from a first reverse-direction tap (RDT);
   analyzing the first signal with a first remote diagnostic management tool (RDMT) located remote from a headend at a first location, the first signal is a first upstream signal received via a first diagnostic reverse (DR) tap of the first RDT and a first Proactive Network Management (PNM) headend module of the first RDMT;
   receiving a second signal from a second RDT located downstream from the first RDT;
   analyzing the second signal with a second RDMT located remote from the headend at a second location, the second signal is a second upstream signal received via a second DR tap of the second RDT and a second PNM headend module of the second RDMT;
   comparing the first signal to the second signal; and
   determining, based on the comparing, a third location of a faulty component in the HFC network.

10. The method of claim 9, wherein the first signal comprises a non-linearity, wherein the second signal does not comprise a non-linearity, and wherein the determining comprises ascertaining that the third location is between the first RDT and the second RDT.

11. The method of claim 9, wherein the first RDT and the second RDT are remote from the headend.

12. The method of claim 10, wherein the determining further comprises further ascertaining that the third location is associated with an amplifier or a corroded connector that is non-linear.

13. The HFC network of claim 2, wherein the tap further comprises:
   an input port coupled to the input line;
   a first directional coupler (DC) coupled to the input port;
   a proactive network management (PNM) interconnect coupled to the first DC;
   a second DC coupled to the PNM interconnect; and
   a third DC coupled to the second DC.

14. The HFC network of claim 3, wherein the tap further comprises:
   a first directional coupler (DC) coupled to the DR port;
   a second DC coupled to the first DC; and
   an output port coupled to the second DC and the output line.

* * * * *